US011118896B2

(12) United States Patent
Sesko et al.

(10) Patent No.: US 11,118,896 B2
(45) Date of Patent: Sep. 14, 2021

(54) CONFIGURATION FOR COUPLING CHROMATIC RANGE SENSOR OPTICAL PROBE TO COORDINATE MEASUREMENT MACHINE

(71) Applicant: Mitutoyo Corporation, Kanagawa-ken (JP)

(72) Inventors: David William Sesko, Woodinville, WA (US); Isaiah Freerksen, Bothell, WA (US)

(73) Assignee: MITUTOYO CORPORATION, Kanagawa-Ken (JP)

( * ) Notice: Subject to any disclaimer, the term of this patent is extended or adjusted under 35 U.S.C. 154(b) by 0 days.

(21) Appl. No.: 16/698,078

(22) Filed: Nov. 27, 2019

(65) Prior Publication Data

US 2021/0156667 A1    May 27, 2021

(51) Int. Cl.
*G01B 11/00* (2006.01)
*G02B 6/42* (2006.01)
*G02B 27/00* (2006.01)

(52) U.S. Cl.
CPC .......... *G01B 11/005* (2013.01); *G02B 6/4206* (2013.01); *G02B 27/005* (2013.01)

(58) Field of Classification Search
CPC .. G02B 6/3885; G02B 6/3825; G02B 6/3897; G02B 6/3821; G02B 6/3893; G02B 6/3879; G02B 6/3887; G02B 6/4471; G02B 6/3849; G02B 6/3869; G02B 6/3882; G02B 6/3831; G02B 6/381; G02B 6/387; G02B 6/3871; G02B 6/389; G02B 6/3895;
(Continued)

(56) References Cited

U.S. PATENT DOCUMENTS 4,908,951 A    3/1990 Gurny
5,825,666 A    10/1998 Freifeld
(Continued)

FOREIGN PATENT DOCUMENTS

DE    10 2007 054 915 A1    5/2009
EP    2 667 147 A1    11/2013
(Continued)

OTHER PUBLICATIONS

Extended European Search Report, dated Apr. 30, 2021, for European Application No. 20207092.6-1010, 7 pages.

*Primary Examiner* — Michael P Stafira
(74) *Attorney, Agent, or Firm* — Seed IP Law Group LLP

(57) ABSTRACT

A configuration for coupling a chromatic range sensor optical probe to a coordinate measurement machine (CMM) includes an electric auto connection and a free-space fiber optic coupling with first and second coupling elements. The first coupling element has a first fiber optic connector configured to couple to wavelength detector and light source elements of a CMM through a first optical fiber, and is configured to mount to a probe head of the CMM. The second coupling element has a second fiber optic connector configured to couple to an optical pen of a chromatic range sensor (CRS) optical probe through a second optical fiber, and is configured to mount to the CRS optical probe. One of the first or second coupling elements includes a pair of optical lenses configured to collimate light received via the first optical fiber and focus the collimated light into the second optical fiber.

23 Claims, 16 Drawing Sheets

(58) Field of Classification Search
CPC .. G02B 6/3898; G02B 6/4472; G02B 6/3826; G02B 6/4292; G02B 6/3837; G02B 6/3841; G02B 6/3843; G02B 6/3851; G02B 6/3873; G02B 6/3889; G02B 6/4262; G02B 6/4401; G02B 6/4446; G02B 6/4477; G02B 6/4479; G02B 6/3861; G02B 6/3839; G02B 6/36; G02B 6/3652; G02B 6/3809; G02B 6/3817; G02B 6/3881; G02B 6/3891; G02B 6/3894; G02B 6/4453; G02B 6/3806; G02B 6/3834; G02B 6/3863; G02B 6/3874; G02B 6/406; G02B 6/4214; G02B 6/4296; G02B 6/30; G02B 6/3636; G02B 6/38; G02B 6/3823; G02B 6/3846; G02B 6/385; G02B 6/3853; G02B 6/3866; G02B 6/40; G02B 6/4452; G02B 2006/4297; G02B 6/2551; G02B 6/26; G02B 6/32; G02B 6/382; G02B 6/3833; G02B 6/3847; G02B 6/423; G02B 6/4403; G02B 6/444; G02B 6/4454; G02B 6/448; G02B 23/2476; G02B 6/00; G02B 6/03611; G02B 6/2557; G02B 6/3664; G02B 6/3672; G02B 6/3801; G02B 6/3803; G02B 6/3813; G02B 6/3822; G02B 6/3854; G02B 6/3855; G02B 6/3859; G02B 6/3865; G02B 6/403; G02B 6/422; G02B 6/4239; G02B 6/4257; G02B 6/4266; G02B 6/4273; G02B 6/4278; G02B 6/4293; G02B 6/4429; G02B 6/4442; G02B 6/4444; G02B 6/4455; G02B 6/4475; G02B 6/46; G02B 1/11; G02B 6/02; G02B 6/02052; G02B 6/13; G02B 6/245; G02B 6/25; G02B 6/2558; G02B 6/34; G02B 6/3608; G02B 6/3612; G02B 6/3616; G02B 6/3644; G02B 6/3676; G02B 6/3696; G02B 6/3802; G02B 6/3818; G02B 6/3857; G02B 6/3858; G02B 6/3875; G02B 6/3883; G02B 6/42; G02B 6/4206; G02B 6/4212; G02B 6/4231; G02B 6/4243; G02B 6/4246; G02B 6/4271; G02B 6/428; G02B 6/43; G02B 6/4432; G02B 6/4441; G02B 6/4457; G02B 6/4465; G02B 6/4497; G02B 19/0057; G02B 27/0916; G02B 6/0006; G02B 6/0008; G02B 6/001; G02B 6/12004; G02B 6/1228; G02B 27/0955; G02B 6/0005; G02B 6/02328; G02B 6/02338; G02B 6/12002; G02B 6/122; G02B 6/124; G02B 6/3624; G02B 6/4249; G02B 19/0014; G02B 2006/12038; G02B 2006/1204; G02B 2006/12102; G02B 2006/12107; G02B 2006/12147; G02B 2006/12164; G02B 26/001; G02B 26/0841; G02B 26/10; G02B 26/101; G02B 26/105; G02B 27/0025; G02B 27/005; G02B 27/0977; G02B 27/1086; G02B 3/04; G02B 6/0031; G02B 6/0043; G02B 6/0061; G02B 6/02333; G02B 6/02347; G02B 6/02352; G02B 6/03633; G02B 6/12; G02B 6/1225; G02B 6/1226; G02B 6/125; G02B 6/126; G02B 6/136; G02B 6/14; G02B 6/274; G02B 6/278; G02B 6/2861; G02B 6/29341; G02B 6/3512; G02B 6/3514; G02B 6/4202; G02B 6/4221; G02B 7/008; G01B 9/02091; G01B 11/005; G01B 11/007; G01B 11/0608; G01B 2210/50; G01B 9/02007; G01B 9/02049; G01B 9/02083; G01B 9/0209

See application file for complete search history.

(56) References Cited

U.S. PATENT DOCUMENTS

| | | | | |
|---|---|---|---|---|
| 6,312,163 | B1* | 11/2001 | Ono | G02B 6/262 |
| | | | | 385/33 |
| 7,876,456 | B2 | 1/2011 | Sesko | |
| 7,990,522 | B2 | 8/2011 | Sesko | |
| 8,736,817 | B2* | 5/2014 | Jones | G01J 3/2803 |
| | | | | 356/4.01 |
| 8,817,240 | B2* | 8/2014 | Jones | G01B 11/007 |
| | | | | 356/4.01 |
| 9,372,310 | B1* | 6/2016 | Legg | G02B 6/024 |
| 10,365,080 | B2 | 7/2019 | Ruck et al. | |
| 10,564,363 | B1* | 2/2020 | Corl | G02B 6/3803 |
| 2006/0177182 | A1* | 8/2006 | Mine | G02B 6/3825 |
| | | | | 385/74 |
| 2010/0027943 | A1* | 2/2010 | Armani | B01L 3/502715 |
| | | | | 385/74 |
| 2011/0229091 | A1 | 9/2011 | Jensen et al. | |
| 2012/0020619 | A1 | 1/2012 | Kadar-Kallen et al. | |
| 2012/0050723 | A1* | 3/2012 | Emtman | G01B 11/14 |
| | | | | 356/123 |
| 2012/0155809 | A1* | 6/2012 | Yu | G02B 6/32 |
| | | | | 385/74 |
| 2013/0163929 | A1* | 6/2013 | Huang | G02B 6/3895 |
| | | | | 385/56 |
| 2013/0314690 | A1 | 11/2013 | Jones et al. | |
| 2014/0270647 | A1* | 9/2014 | Wild | G02B 6/32 |
| | | | | 385/74 |
| 2015/0009484 | A1* | 1/2015 | Sesko | G01B 11/007 |
| | | | | 356/3 |
| 2016/0161686 | A1* | 6/2016 | Li | G02B 6/4214 |
| | | | | 385/92 |
| 2016/0320571 | A1* | 11/2016 | Wijbrans | G02B 6/3874 |
| 2017/0184395 | A1 | 6/2017 | Paduch et al. | |

FOREIGN PATENT DOCUMENTS

| | | |
|---|---|---|
| EP | 3 184 957 A1 | 6/2017 |
| EP | 3 511 676 A1 | 7/2019 |

* cited by examiner

| Position | Description |
|---|---|
| D0 | Detector pixel clock |
| D1 | Profile start signal |
| D2 | Spectrometer ready signal |
| D3 | XYZ Latch signal |
| D4 | Detector temperature alarm |
| D5 | Spectrometer temperature alarm |
| D6 | Unused |
| D7 | Unused |
| D8 | Unused |
| D9 | Unused |

| Wire # | Signal Direction | CRS Signal Description |
|---|---|---|
| one of wires 2-14 | ↑ | +12V, 300 mA |
| one of wires 2-14 | ↑ | +12V, 300 mA |
| one of wires 2-14 | - | GND |
| one of wires 2-14 | ↓ | SERDES+ |
| one of wires 2-14 | ↓ | SERDES- |
| one of wires 2-14 | - | GND |
| one of wires 2-14 | ↑ | SERDES Lock/Sync |
| one of wires 2-14 | ↑ | Spectrometer Reset |
| one of wires 2-14 | ↕ | I²C Clock |
| one of wires 2-14 | ↕ | I²C Data |
| one of wires 2-14 | - | Other |
| one of wires 2-14 | - | Other |
| one of wires 2-14 | - | Other |
| one of wires 2-14 | - | GND |
| Inner Shield | - | GND |
| Outer Shield | - | GND |
| Coax/1 | ↓ | Detector profile signal(s) |

FIG. 7

CONFIGURATION FOR COUPLING CHROMATIC RANGE SENSOR OPTICAL PROBE TO COORDINATE MEASUREMENT MACHINE

BACKGROUND

Technical Field

The disclosure relates generally to precision measurement instruments, and more particularly to chromatic range sensor optical probes such as may be used with coordinate measurement machines for determining measurements of workpieces.

Description of the Related Art

In one type of coordinate measuring machine, the surface of a workpiece is scanned with a probe. After the scan, a three dimensional profile of the workpiece is provided. In one type of scanning probe, the workpiece is directly measured by touching a mechanical contact of the probe to various points along the workpiece surface. In some cases, the mechanical contact is a ball.

In other coordinate measuring machines, an optical probe is utilized which measures the workpiece without making physical contact with the surface. Certain optical probes (e.g., triangulation probes) utilize light to measure workpiece surface points, and some optical probes comprise video cameras which are used to image 2-D sections of the workpiece surface (e.g., stereo vision systems, or structured light systems). In some systems, the coordinates of the geometric elements of the workpiece are determined via image processing software.

Certain "combined" coordinate measuring machines that use both optical and mechanical measuring sensors are also known. One such device is described in U.S. Pat. No. 4,908,951, which is hereby incorporated by reference in its entirety. The described apparatus has two spindles, one that carries the mechanical probe, and one that holds a video camera having a beam path into which a laser probe is simultaneously reflected for making measurements in the Z coordinate, that is, along the optical axis of the video camera.

U.S. Pat. No. 5,825,666, which is hereby incorporated by reference in its entirety, describes an optical coordinate measuring machine wherein an optical touch probe of the device has a first target on the distal end thereof, on the contact element of a standard probe. The standard probe is mounted to a video camera to image the target on the camera. Movement and position of the target in the X and Y coordinates is indicated by the machine's computer image processing system. A second target is mounted to the proximal end of the probe and indicates movement and position in the Z coordinate. The second target may obscure a photo detector, but can be focused on the camera by a light beam parallel to the X, Y plane. There can be two second targets illuminated by orthogonal beams parallel to the X, Y plane. Rotation around the Z axis then may be calculated by the computer when star probes are used. Auto changing racks are also disclosed for holding multiple probes, a probe holder, and lenses for selective mounting on the camera.

Measuring probes are frequently interchangeably attached to coordinate measuring machines at an auto exchange joint connection included in various "probe heads." At present, Renishaw™ probe heads are the most commonly used for certain applications in the industry. These probe heads are manufactured by Renishaw Metrology Limited in Gloucestershire, United Kingdom.

While Renishaw-type probe head systems are the most commonly used in the industry, certain technologies are not easily incorporated into Renishaw-type systems. Furthermore, attempts to upgrade an existing Renishaw-type probe head system to one with more advanced capabilities can entail significant costs and/or inconvenience. For example, certain technologies adapted to a Renishaw-type probe head system may lack desirable features, lack a desirable level of controllability, and/or lack the capacity for being easily or automatically interchangeable with other types of probes that may be interfaced to the Renishaw-type probe head system. One particular issue with regard to using Renishaw-type probe head systems, or similar systems, is that the existing data and control connections between the machines and the probes consist of a limited number of wired connections and no optical fiber connections or optical paths at the auto exchange joint. This effectively forms a "bottleneck" which makes it difficult to add additional technologies and/or features to a probe that is to be mounted and/or exchanged using the probe head system. In particular, existing chromatic range sensors have not been automatically attachable and/or interchangeable using a Renishaw-type probe head system, or the like. The architecture of certain existing chromatic range sensors is not compatible with data and control connections included in Renishaw-type probe head systems.

A related issue for the coupling and decoupling of optical fiber connections (e.g., in systems such as those noted above), is that known contact fiber couplers tend to become damaged with repeated mating cycles due to contamination of the fiber faces. Typical mating cycles of optical fiber connectors are in some implementations rated to 500-1000 cycles under clean conditions. However, a small amount of dirt or dust on a fiber core (e.g., a 50 micron fiber core) can lead to high throughput loss.

A configuration for coupling a chromatic range sensor optical probe to a coordinate measurement machine that provides improvements with respect to such issues would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various implementations, a free-space fiber optic coupling has a first coupling element and a second coupling element configured to detachably couple together. The first coupling element has a first fiber optic connector configured to couple to wavelength detector and light source elements of a coordinate measurement machine (CMM) through an optical fiber of a first fiber optic cable, and is configured to mount to a probe head of the CMM. The second coupling element has a second fiber optic connector configured to couple to an optical pen of a chromatic range sensor (CRS) optical probe through an optical fiber of a second fiber optic cable, and is configured to mount to the CRS optical probe. One of the first and second coupling elements includes a pair of optical lenses configured to collimate light received via the optical fiber of the first fiber optic cable and focus the collimated light into the optical fiber of the second fiber optic cable. The pair of lenses is configured to collimate reflected light received via the optical fiber of the second fiber optic cable and focus the collimated reflected light into the optical fiber of the first fiber optic cable.

In some implementations, a chromatic range sensor (CRS) optical probe has an optical pen and an optical fiber cable coupled to the optical pen. The optical pen has a confocal optical path including at least a confocal aperture and a chromatically dispersive optics portion, the optical pen configured to focus different wavelengths at different distances along a measurement axis proximate to a workpiece surface to be measured. The CRS optical probe has a coupling element of a free-space fiber coupling coupled to the optical fiber cable and mounted to the CRS optical probe. The coupling element is configured to receive focused light transmitted in free-space by a focusing lens of a corresponding coupling element of the free-space fiber coupling mounted to a probe head of a coordinate measurement machine (CMM). The CRS optical probe also has an auto exchange joint element which is attachable through an auto exchange joint connection to the CMM.

In some implementations, a coordinate measurement machine (CMM), comprises light generating circuitry, wavelength detection circuitry, CMM control circuitry, a fiber optic cable coupled to the light generating circuitry and the wavelength detection circuitry, and a probe head having an auto exchange joint connection configured to couple to an auto exchange element of a chromatic range sensor (CRS) optical probe. The CMM includes a coupling element of a free-space fiber optic coupling mounted to the probe head. The coupling element is coupled to the fiber optic cable and has a free-space lens system including a pair of lenses, the lens system being configured to collimate light received via the fiber optic cable and focus the collimated light into a fiber of a fiber optic cable of a corresponding coupling element of the CRS optical probe.

In some implementations, a system comprises a coordinate measurement machine (CMM) and a chromatic range sensor (CRS) optical probe. The CMM includes light generating circuitry, wavelength detection circuitry, CMM control circuitry, a probe head having an auto exchange joint connection and a first coupling element of a free-space fiber optic coupling mounted to the probe head. The CRS optical probe includes an optical pen having a confocal optical path including at least a confocal aperture and a chromatically dispersive optics portion, the optical pen configured to focus different wavelengths at different distances along a measurement axis proximate to a workpiece surface to be measured, a second coupling element of the free-space fiber coupling mounted to the CRS optical probe and an auto exchange joint element which is attachable through the auto exchange joint connection to the CMM. One of the first and second coupling elements of the free-space fiber coupling includes a free-space lens system having a pair of lenses and the other of the first and second coupling elements of the free-space fiber coupling is configured to receive focused light transmitted in free-space by the pair of lenses.

In some implementations, a method comprises automatically coupling a coordinate measurement machine (CMM) to a chromatic range sensor (CRS) optical probe. The automatic coupling includes attaching an auto exchange joint element of the CRS optical probe to an auto exchange joint connection of the CMM and connecting a first coupling element of a free-space optical fiber coupling attached to the CMM to a second coupling element of the free-space optical fiber coupling attached to the CRS optical probe. One of the coupling elements of the free-space optical fiber coupling includes a pair of optical lenses. Light is generated using the CMM. The generated light is transmitted to the CRS optical probe via the free-space optical fiber coupling. The pair of optical lenses collimates the light generated by the CMM and focuses the light into an optical fiber of the second coupling element of the free-space optical fiber coupling. Reflected light from the CRS optical probe is transmitted to the CMM via the free-space optical fiber coupling. The pair of optical lenses collimates the reflected light and focuses the reflected light into an optical fiber of the first coupling element of the free-space optical fiber coupling.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a table outlining one exemplary connection and/or signal scheme usable with the connection pins of an autojoint connection and the cable of FIG. 6;

DETAILED DESCRIPTION

Figure 1:
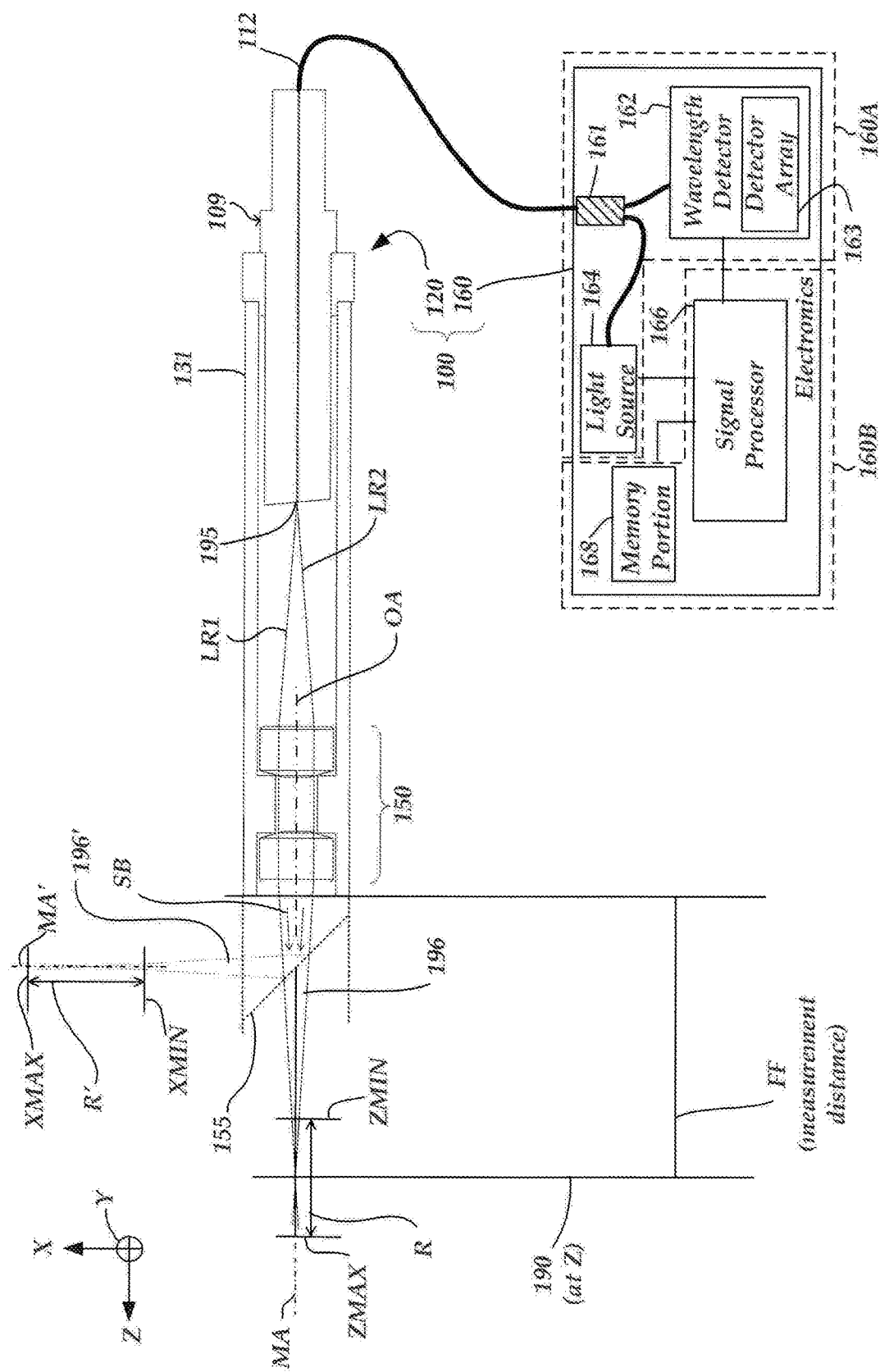
FIG. 1 is a block diagram of an exemplary CRS system including an optical pen.

FIG. 1 is a block diagram of an exemplary chromatic range sensor (CRS) system 100 of a first type based on operating principles that are desirable to employ in conjunction with a coordinate measurement machine. The CRS system 100 has certain similarities to sensors described in U.S. Pat. Nos. 7,876,456 and 7,990,522 (the '456 and '522 patents, respectively), which are hereby incorporated herein by reference in their entireties. As shown in FIG. 1, the CRS system 100 includes an optical element 120 and an electronics portion 160. It will be appreciated that the CRS system 100 shown in FIG. 1 is a chromatic point sensor system which measures a single measurement point at a time. The optical element 120 shown in FIG. 1 is an optical pen. However, in various embodiments alternative types of chromatic range systems, such as a chromatic line sensor, may be configured to operate according to the systems and methods disclosed herein.

The optical pen 120 includes a fiber optic connector 109, a housing 131 (e.g. an assembly tube), and an optics portion 150. The fiber optic connector 109 is attached to the end of the housing 131. In various implementations, the fiber optic connector 109 may be oriented at an angle relative to the housing 131. The fiber optic connector 109 receives an in/out optical fiber (not shown in detail) through a fiber optic cable 112 which encases it. The in/out optical fiber outputs source light through a fiber aperture 195, and receives reflected measurement signal light through the fiber aperture 195.

In operation, broadband (e.g. white) source light emitted from the fiber end through the fiber aperture 195 is focused by the optics portion 150, which includes a lens or lenses that provide an axial chromatic dispersion, such that the focal point along the optical axis OA is at different distances depending on the wavelength of the light, as is known for chromatic confocal sensor systems. The source light forms a measurement beam 196 that includes a wavelength that is focused on a workpiece surface 190 at a position Z relative to the optical pen 120. Upon reflection from the workpiece surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance from the optical pen 120 to the surface 190. The optical pen is configured such that the wavelength that is best focused at the surface 190 will also be the wavelength of the reflected light that is best focused at the fiber aperture 195. The fiber aperture 195 spatially filters the reflected light such that predominantly the best focused wavelength passes through the fiber aperture 195 and into the core of the optical fiber cable 112. As described in more detail below and in the incorporated references, the optical fiber cable 112 routes the reflected signal light to a wavelength detector 162 that is utilized for determining the wavelength having the dominant intensity, which corresponds to the measurement distance to the workpiece surface 190.

FIG. 1 also schematically illustrates an optional reflective element 155 in dashed outline. As described in more detail in U.S. Patent Publication No. 20120050723, which is hereby incorporated by reference in its entirety, a reflective element may be placed in the path of the source beam SB. In such an implementation, rather than the measurement axis MA being coaxial with the optical axis OA, the reflective element may direct the measurement beam 196' along a measurement axis MA' in a different direction (e.g. orthogonal to the optical axis) as needed in some measurement applications. Such an orthogonal orientation is utilized in the embodiments illustrated in FIGS. 2 and 4A, as will be described in more detail below.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement wherein a dispersive optics portion (e.g. a grating) receives the reflected light through the optical fiber cable 112 and transmits the resulting spectral intensity profile to a detector array 163. The wavelength detector 162 may also include related signal processing (e.g. provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g. a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190 at the position Z. The reflected wavelength-dependent light intensity then passes through the fiber coupler 161 again so that approximately 50% of the light is directed to the wavelength detector 162, which may receive a spectral intensity profile distributed over an array of pixels along a measurement axis of the detector array 163, and operate to provide corresponding profile data as described in more detail in the incorporated references. Briefly, a sub-pixel-resolution distance indicating coordinate of the profile data (e.g. a peak position coordinate) is calculated by the signal processor 166, and the distance indicating coordinate corresponding to the wavelength peak determines the measurement distance to the surface via a distance calibration lookup table which is stored in the memory portion 168. The distance indicating coordinate may be determined by various methods such as determining the centroid of profile data included in a peak region of the profile data.

The optical pen 120 generally has a measurement range R that is bound by a minimum range distance ZMIN and a maximum range distance ZMAX. The measurement range R in some example instances of known optical pens may be approximately 1/10th of the nominal standoff or working distance from the end of the pen (e.g. in the range of tens of microns to a few millimeters). FIG. 1 schematically illustrates that if the reflector element 155 is used, the measurement range R' may be directed along a measurement axis MA' determined by the placement of the reflector element 155 (e.g. the x-axis). In such a case, the measurement range R' may be bound by minimum range distance XMIN and a maximum range distance XMAX.

It should be appreciated that the electronics portion 160 has conventionally be located away from the optical pen 120. It has been known to mount an optical pen analogous to the optical pen 120 shown in FIG. 1 on a CMM using a customized bracket, and to route an optical fiber analogous to the optical fiber cable 112 along a makeshift path on the outside of CMM components to a remotely located electronics analogous to the electronics 160. This inadequate and inconvenient method has persisted for a number of years, as a desirable combination of features has not been provided that allows an automatically interchangeable CRS optical probe system. The use of CRS systems with CMM's has thus been limited.

As disclosed in more detail below with respect to FIGS. 2, 3A and 3B, in order to provide a desirable combination of features that provide a technically and economically attractive automatically interchangeable CRS optical probe system, certain components of the electronics portion 160 are desirable to include within a CRS optical probe assembly that is mated to a CMM through an auto joint connector. For example, in one implementation, a group of components in a light source and wavelength detector portion 160A (e.g. including the wavelength detector 162 and light source 164) may be included inside a CRS optical probe assembly. A group of components in a measurement signal processing and control circuit 160B (e.g. including the signal processor 166 and memory portion 168) may be located remotely outside of the CRS optical probe assembly, if desired (e.g. to maintain low probe weight and compact probe size).

Figure 2:
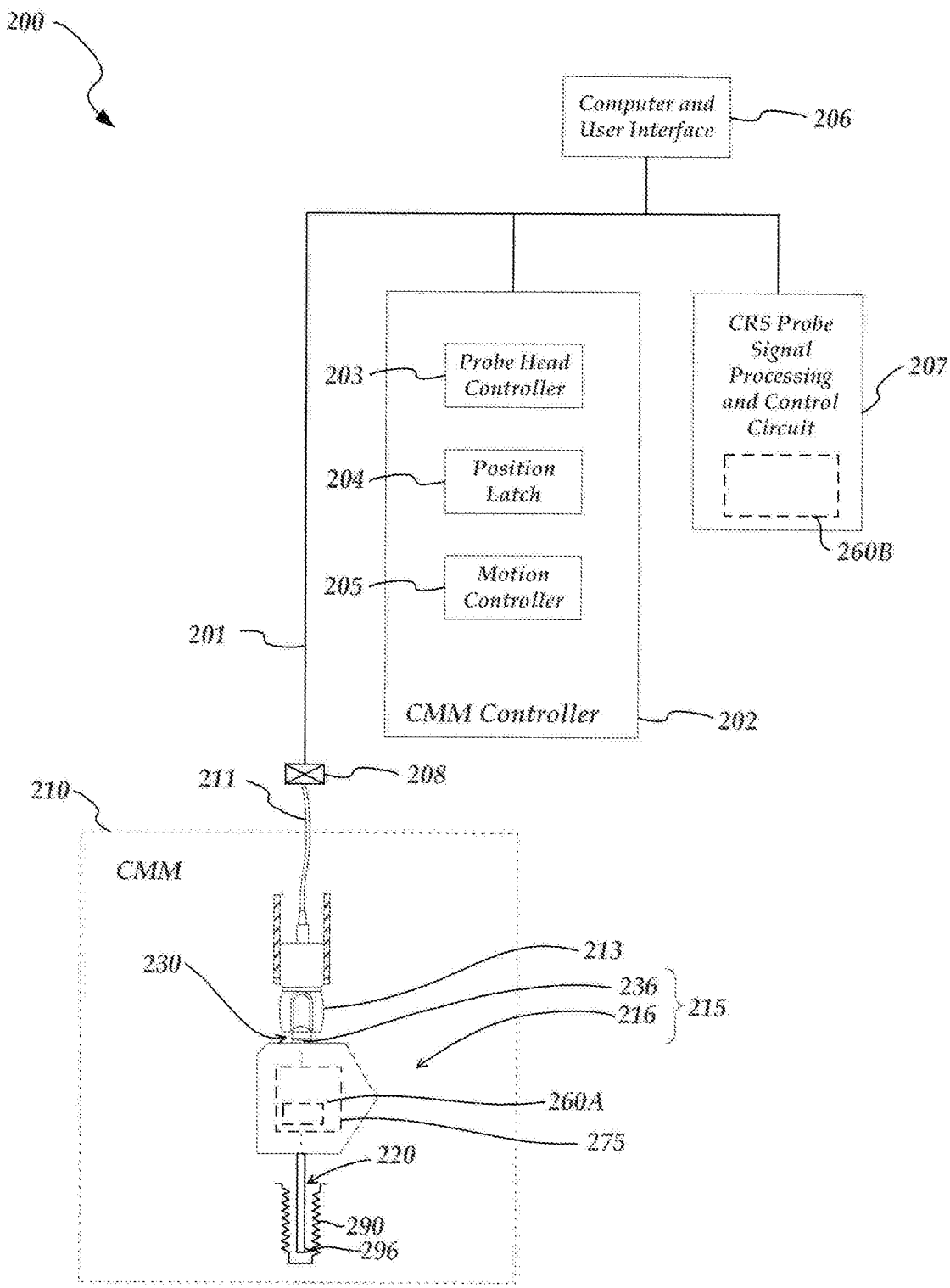
FIG. 2 is a block diagram of a coordinate measurement system including a coordinate measurement machine, a CRS optical probe including an optical pen, controllers and a user interface.

FIG. 2 is a diagram of a coordinate measurement system 200, and an automatically connectable and interchangeable CRS optical probe system 215. That is, the CRS optical probe system 215 may be automatically interchanged with other types of CMM probes. A CRS optical probe system may also be referred to simply as a CRS optical probe herein. In various drawings herein, unless otherwise indicated by description or context, reference numbers having similar suffixes (e.g. reference number 1XX and 2XX having the suffix XX) may refer to generally analogous elements, such that operation of element 2XX may be generally understood by one of ordinary skill in the art with limited description, based on analogy to a previous description of analogous element 1XX, and so on. However, it will be understood that despite such analogy, various elements may have different implementations in different embodiments, as will be apparent to one of ordinary skill in the art, and are not limited to be identical.

The coordinate measurement system 200 includes a coordinate measurement machine controller 202, a computer and user interface 206, a probe signal processing and control circuit 207, and a coordinate measurement machine 210. The controller 202 includes a probe head controller 203, a position latch 204 and a motion controller 205. The CRS optical probe 215 includes an auto exchange joint element 236, and is connected to the coordinate measurement machine 210 through a mating joint element in the probe autojoint connection 230 (also referred to as an auto exchange joint connection).

The coordinate measurement machine 210 communicates with all of the other components through a data transfer line 201 (e.g. a bus), which is connected by a connector 208 (e.g. a "micro-D" type connector) to a probe head cable 211 which provides signals to and from the CRS optical probe 215. The coordinate measurement machine 210 is controlled by the coordinate measurement machine controller 202, while the CRS optical probe 215 exchanges data with, and is controlled by, the probe signal processing and control circuit 207 (e.g. in one embodiment, a probe signal processing and control circuit including measurement signal processing and control elements 260B, as outlined above with reference to the element 160B in FIG. 1). The user may control all of the components through the computer and user interface 206.

As outlined above, and described in more detail below with respect to FIGS. 3A and 3B, the CRS optical probe 215 includes a probe electronics 275 which includes a light source and wavelength detector portion 260A (e.g. in one embodiment, a light source and wavelength detector as outlined above with reference to the element 160A, in FIG. 1), and an optical pen 220, which directs a measurement beam 296 toward a measurement surface 290. In one specific example implementation, the measurement surface 290 may comprise an internal surface of a threaded hole. Such surfaces have been difficult or impossible to measure completely and reliably with known CMM probes (e.g. a touch probe). A CRS optical probe such as that disclosed herein is able to scan and measure such surfaces with improved completeness, accuracy and versatility.

As will be described in more detail below with respect to FIG. 5, in one embodiment, data related to the optical pen and/or interchangeable optics element (e.g. identification data, calibration data, compensation data, etc.) may be stored externally to the CRS optical probe 215 (e.g. in the probe signal processing and control circuit 207.) In alternative implementations, portions of such data may be stored or otherwise encoded within portions of the CRS optical probe 215.

Figure 3A:
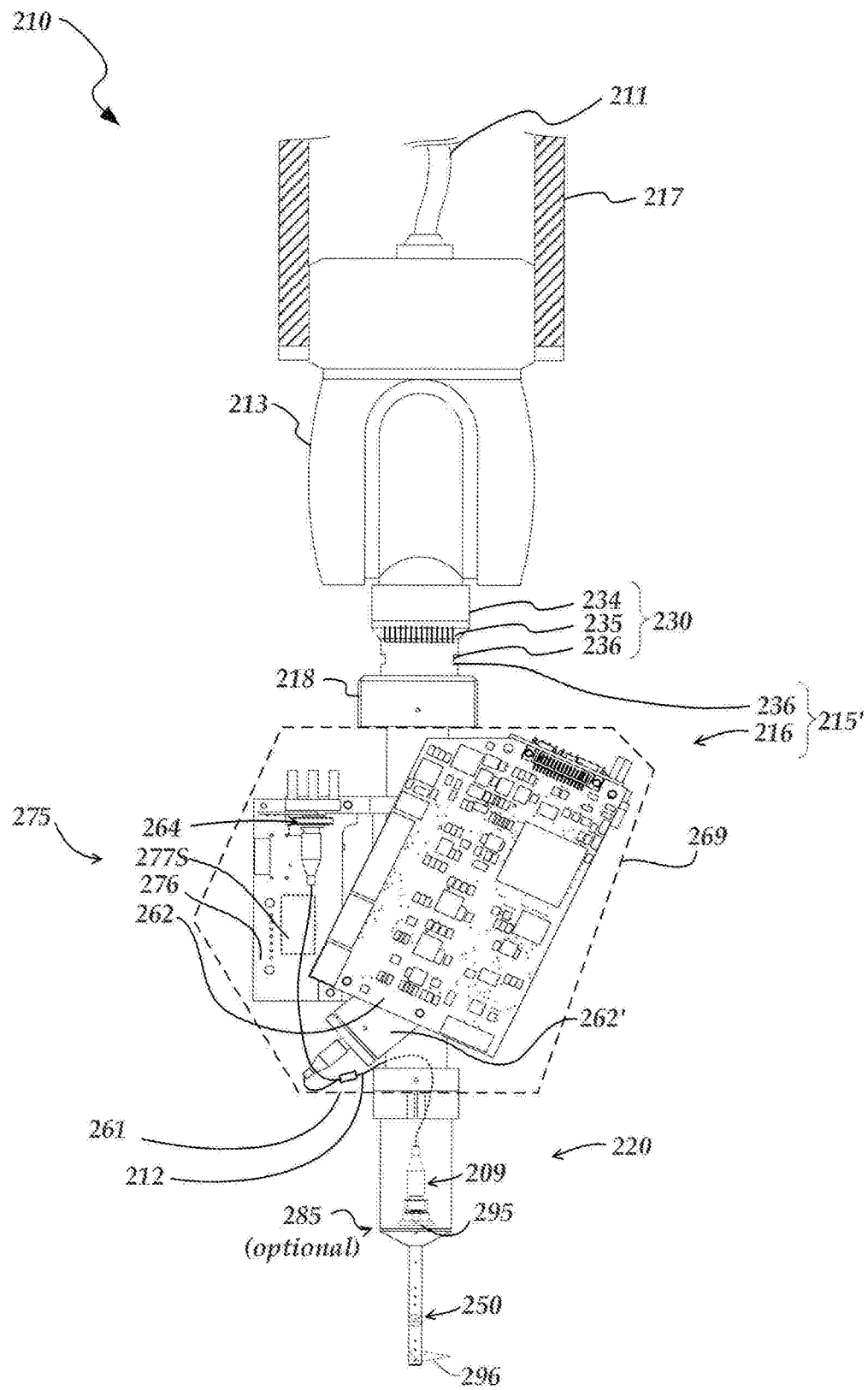
FIGS. 3A and 3B are diagrams illustrating the internal components of a first exemplary embodiment of the CRS optical probe of FIG. 2.
Figure 3B:
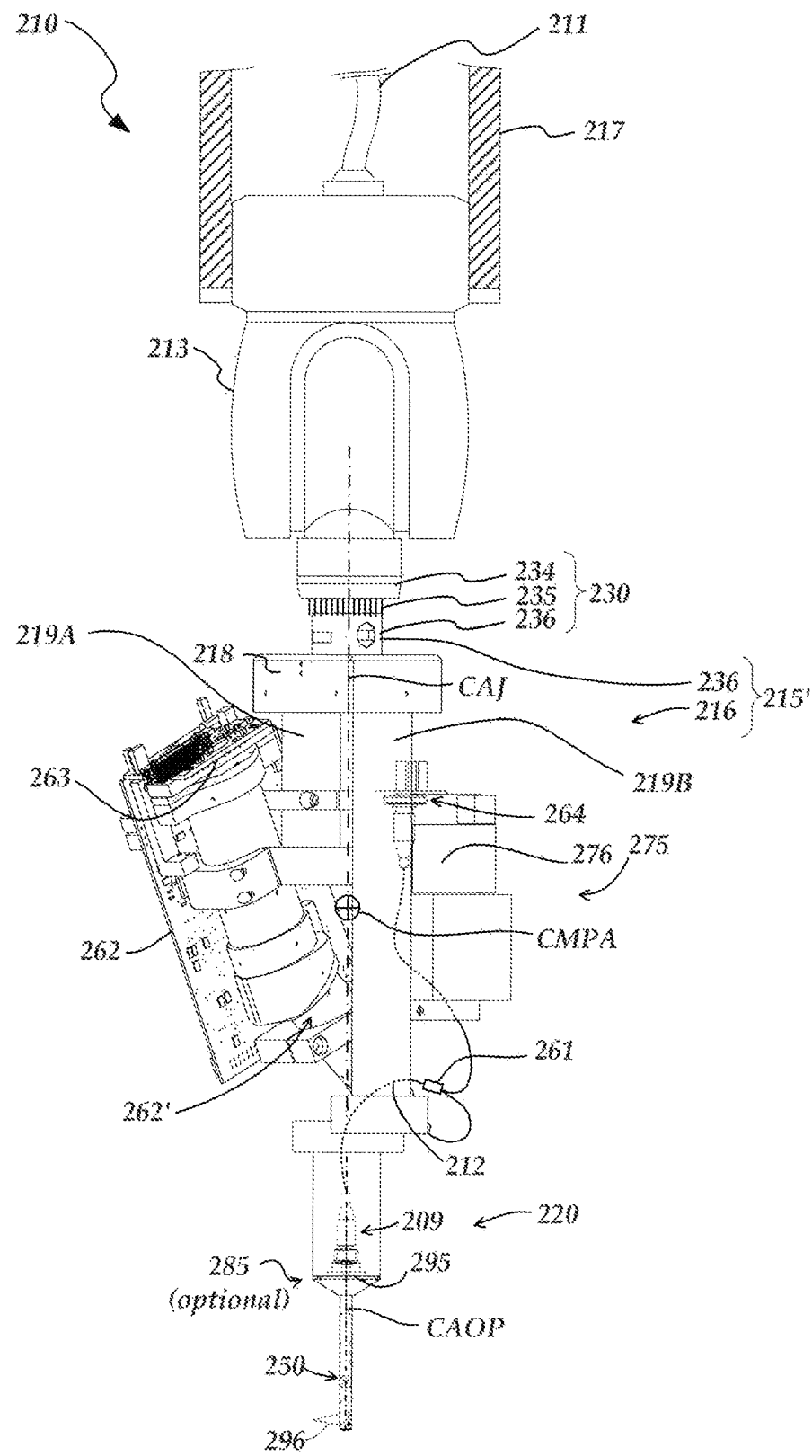

FIGS. 3A and 3B are diagrams schematically illustrating certain components of the coordinate measurement machine 210 and a CRS optical probe 215', which is similar to the CRS optical probe 215 of FIG. 2. FIG. 3A is a front view, and FIG. 3B is a view from a different angle of the coordinate measurement machine 210 and the CRS optical probe 215'. As shown in FIGS. 3A and 3B, the coordinate measurement machine 210 includes a probe head 213. The probe head 213 receives and transmits probe signals through the probe head cable 211. The probe head 213 is secured to a coordinate measurement machine quill 217. The probe head 213 is connected to the probe 215' at a probe autojoint connection 230 which will be described in more detail below with respect to FIG. 6.

The probe head 213 in some embodiments rotates in 360 degrees in a horizontal plane and contains a type of U-joint. The probe autojoint connection 230 is an electro-mechanical connection that fastens the probe head 213 rigidly and mechanically to the CRS optical probe 215', in a way such that it can be disconnected from one probe and attached to another. In one embodiment, the probe autojoint connection 230 may include first and second mating auto exchange joint elements 234 and 236, wherein the first auto exchange joint element 234 is mounted to the probe head 213, and the second mating auto exchange joint element (236) is mounted to the CRS optical probe 215'. In one embodiment, the probe autojoint connection 230 has mating electrical contacts or connections 235 so that when a probe is attached, the contacts automatically engage and make electrical connections. In some embodiments, this connection method can cause the system to have a relatively high amount of signal noise, which as will be described in more detail below makes it advantageous to use certain configurations and methods which can function effectively in a relatively noisy environment.

The CRS optical probe 215' receives its power and control signals through the autojoint connection 230. The signals passed to the CRS optical probe 215' through the autojoint connection 230 are passed through connections 235 as will be described in more detail below with respect to FIG. 6. As shown in FIGS. 3A and 3B, the CRS optical probe 215' includes auto exchange joint element 236 and a probe assembly 216 that is mounted to the auto exchange joint element 236, for automatic connection to the CMM through the probe autojoint connection 230. The probe 215' may also include a protective cover or housing 269 (schematically illustrated). The probe assembly 216 comprises an optical pen 220, and probe electronics 275 which may comprise an electrically powered light source 264 and a wavelength detector 262, all supported by various structural members. In the embodiment shown in FIGS. 3A and 3B, the structural members extend from a base 218 that is attached to the auto exchange joint element 236. The optical pen 220 (analogous to the optical pen 120) may include a fiber optic connector 209, and a confocal optical path including an aperture 295 and chromatically dispersive optics portion 250, which outputs a measurement beam 296. In some embodiments, the optical pen 220 may include a repeatable fast exchange mount 285 which allows replacement of the chromatically dispersive optics portion 250, as described in greater detail below. The electrically powered light source 264 (e.g. a broad spectrum LED light source) may work in conjunction with known circuits (e.g. as found in commercial chromatic ranging systems) included in a probe power and signal control circuit portion 276 which is included in probe electronics 275, and which receives electrical power transmitted through the auto exchange joint element. In some embodiments, the probe electronics 275 includes a serializer 277S that allows various data signals to be serialized and communicated through the autojoint connection 230 using relatively few wires to a deserializer (included, for example, in the probe signal processing and control circuit 207), as described in greater detail below. In the embodiment shown in FIG. 3A, the serializer 277S is included on the probe power and signal control circuit portion 276. However, in other embodiments, the serializer 277S may be included with the CRS wavelength detector 262, since much of the serialized data to be transmitted is measurement spectral profile data that originates in the CRS wavelength detector 262. More generally, the serializer 277S may be located at any desired location in the probe electronics 275 that provides satisfactory noise and crosstalk characteristics.

The light source 264 generates light originating in the CRS optical probe assembly, the light comprising an input spectral profile of wavelengths routed to the optical pen 220 through the fiber optic cable 212. The CRS wavelength detector 262 may comprise known circuits (e.g. as found in commercial chromatic ranging systems) that work in conjunction with a spectrometer arrangement 262' and detector array 263 comprising a plurality of pixels distributed along a measurement axis of the CRS wavelength detector, the plurality of pixels receiving respective wavelengths reflected into the confocal optical path from the target surface and providing output spectral profile data.

It will be appreciated that a configuration such as that outlined above which generates and processes the light used for measurement entirely within the CRS optical probe assembly allows the CRS optical probe assembly to be self-contained and automatically exchangeable. In various embodiments, such a CRS optical probe system does not require or include an optical fiber connection from the CRS optical probe assembly to an outside element through the auto joint connector, or along any other makeshift path in parallel with the auto joint connector. Stated another way, in various embodiments, such a CRS optical probe assembly does not connect to or include an optical fiber that extends outside of the CRS optical probe assembly.

In various embodiments, the CRS optical probe assembly is configured such that the optical pen is mounted at a distal end of the CRS optical probe assembly. In the embodiment shown in FIGS. 3A and 3B, the CRS optical probe assembly 215' includes the base portion 218, a wavelength detector mounting portion 219A coupled to the base portion 218, and an optical pen mounting portion 219B coupled to the base portion and carrying the optical pen without carrying the wavelength detector, which may isolate heat and mass-related deflection and vibration away from the optical pen. In some embodiments, one or both of the mounting portions 219A and 219B may comprise a hollow structural tube (e.g. a carbon fiber tube) that extends away from the base portion and toward the distal end of the CRS optical probe assembly.

In one embodiment, the center of mass of the optical pen 220 is located proximate to an axis defined by the center of mass CMPA of the rest of the CRS optical probe 215' and the center axis CAJ of the probe autojoint connection 230. Such a configuration may provide for smoother operation of the probe head 213 as it is utilized to move the CRS optical probe 215' (e.g. avoiding unnecessary additional torque, vibration, deflection, etc.) In one implementation, the optical pen 220 may also be mounted relative to the probe autojoint connection 230 such that the central axis CAOP (e.g. a reference axis for measurements) of the optical pen 220 is coaxial with the central axis CAJ of the auto exchange joint 230. In such a configuration, when the CMM rotates the probe autojoint connection 230 around its axis, the optical pen 220 may also be rotated around its axis with no lateral movement of the measurement reference axis in a X-Y plane. Such a configuration may provide certain advantages (e.g. being mechanically more stable, simplifying the calculation of the location of the measurements taken with the optical pen 220 relative to the positioning by the CMM, etc.)

Figure 4A:
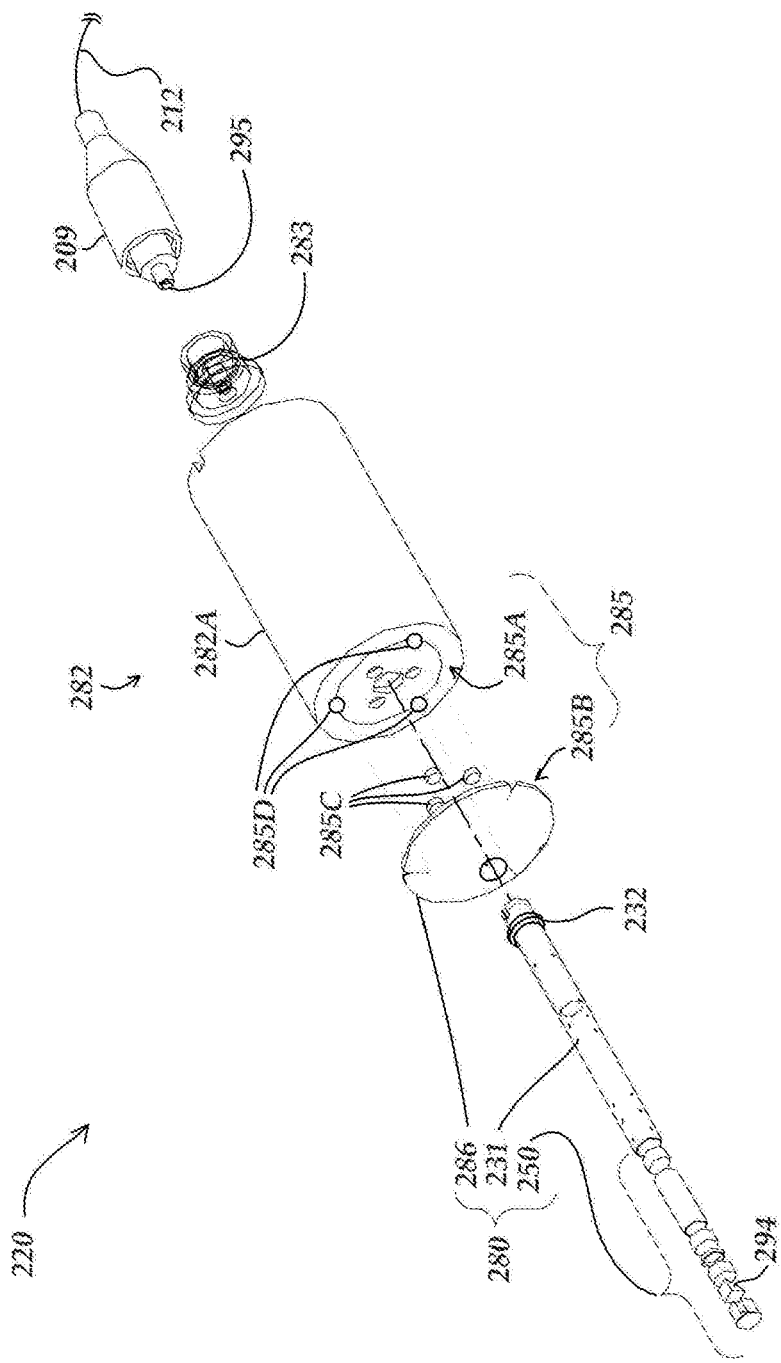
FIGS. 4A and 4B are diagrams illustrating the components of the optical pen including the repeatable fast exchange mount and the interchangeable optics element of FIGS. 3A and 3B.
Figure 4B:
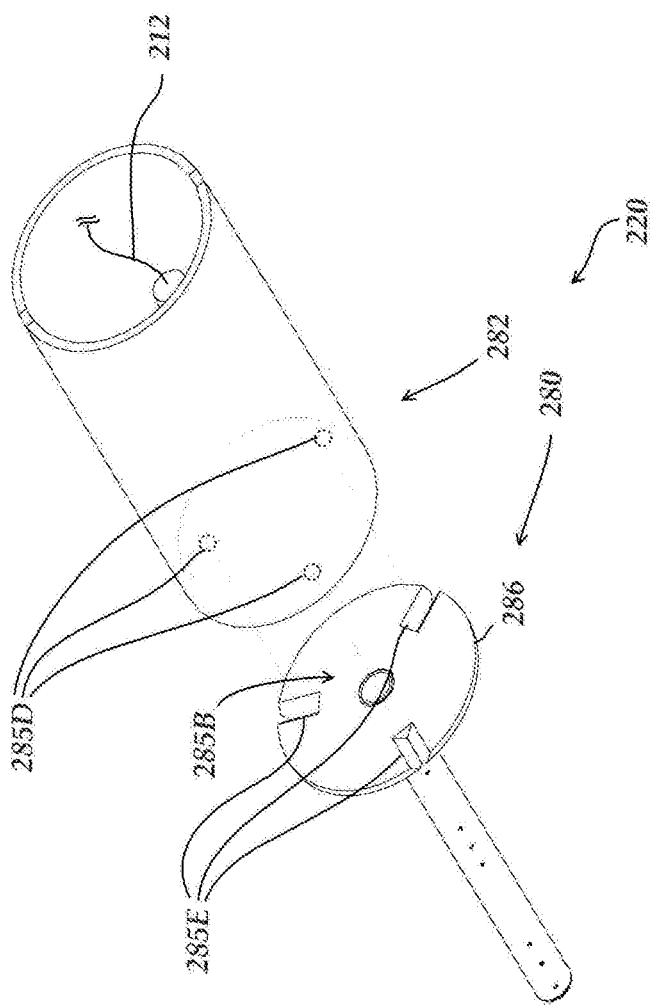

FIGS. 4A and 4B are diagrams illustrating components of the optical pen 220 of FIGS. 3A and 3B, for an embodiment that includes an exemplary repeatable fast exchange mount 285. In the embodiment shown in FIGS. 4A and 4B, the optical pen 220 includes a base member 282 and an interchangeable optics element 280. The interchangeable optics element 280 includes a front plate 286, tube 231, and chromatically dispersive optical portion 250. The base member 282 includes a base housing 282A which includes a surface which serves as a first mating half 285A of the repeatable fast exchange mount 285, and the front plate 286 has a corresponding surface which serves as a second mating half 285B of the repeatable fast exchange mount 285. In one embodiment, the second mating half 285B of the repeatable fast exchange mount 285 is forced against the first mating half 285A by a holding force arrangement comprising permanent magnets 285C mounted in one or both of the first and second mating halves 285A or 285B. More generally, the holding force arrangement may comprise known means such as spring-loaded mechanical detents, or the like. With such a configuration, the second mating half 285B may be automatically connected to and separated from the first mating half 285A under program control (e.g. as controlled by the computer and user interface 206.) For example, in one embodiment the optical pen may include a collar 232 or the like, which may be guided under program control such that it is inserted between the arms of a mating fork included on a probe rack within the motion volume of a CMM. The CMM may then move the CRS optical probe 215' such that the arms of the fork bear on the collar 232 and force the mating halves of the repeatable fast exchange mount 285 apart, leaving the interchangeable optics element 280 hanging in the probe rack. The interchangeable optics element 280 may be mounted back to the base member 282 by the reverse of these operations. In addition, with such a configuration, in the event of a lateral collision with a workpiece, the interchangeable optics element 280 will separate from the base member 282, rather than being damaged.

In one embodiment, the repeatable fast exchange mount 285 may comprise three spheres or balls 285D which are fixed in the first mating half 285A in a first triangular pattern (e.g. an equilateral triangle), and a three radially oriented V-grooves 285E which are fixed in the second mating half 285B in a mating pattern. Such an embodiment of the repeatable fast exchange mount 285 allows the interchangeable optics element 280 to be mounted with the laterally oriented measurement beam 296 facing in any of three different orientations spaced 120 degrees apart. However, it will be appreciated that such an embodiment is exemplary only, and not limiting. Various other repeatable fast exchange mounting configurations may be used, provided that adequate mounting repeatability is provided, as is generally known in the art.

The interchangeable optics element 280 includes the chromatically dispersive optical portion 250 (e.g. analogous to the chromatically dispersive optical portion 150 described above with respect to FIG. 1.) In one embodiment, the base member 282 includes the end of an optical fiber 212 that is connected to the LED light source 264 and to the spectrometer arrangement 262' through a fiber connector 261. The end of optical fiber may be located proximate to a confocal aperture 295 that is fixed relative to the first mating half 285A of the repeatable fast exchange mount 285, which may generally surround the confocal aperture 295. In some embodiments, the end of the optical fiber provides the confocal aperture. In some embodiments, the confocal aperture 295 is provided by a thin aperture that is bonded in place proximate to or abutting the end of the optical fiber (e.g. on a holder or connector that holds the optical fiber). In the embodiment shown in FIG. 4A, the base member 282 includes an optical fiber end positioning arrangement 283 comprising an optical fiber holding element (e.g. a fiber optic connector that mates with the connector 209, in this embodiment) that is fixed (e.g. bonded) in the base member 282 proximate to the first mating half 285A of the repeatable fast exchange mount 285. In this embodiment, the optical fiber end positioning arrangement 283 may comprise an optical fiber holding element that holds the optical fiber (e.g. through the connector 209) and fixes the end of the optical fiber and the confocal aperture 295 relative to the first mating half 285A of the repeatable fast exchange mount 285. However, in other embodiments, the confocal aperture may be separately fixed to the base member 282 and the end of the optical fiber may be fixed proximate to that confocal aperture by a suitable optical fiber end positioning element, if desired, as described in greater detail below.

The interchangeable optics element 280 receives measurement light from, and returns measurement light to, the confocal aperture 295, and provides axial chromatic dispersion of the measurement light over a respective measuring range along a measuring axis. In one embodiment, the chromatically dispersive optical portion 250 may also include a reflective element 294, which directs the measurement beam laterally to the axis of the optical pen 220 (e.g. laterally relative to the axis of the tube 231).

Figure 5:
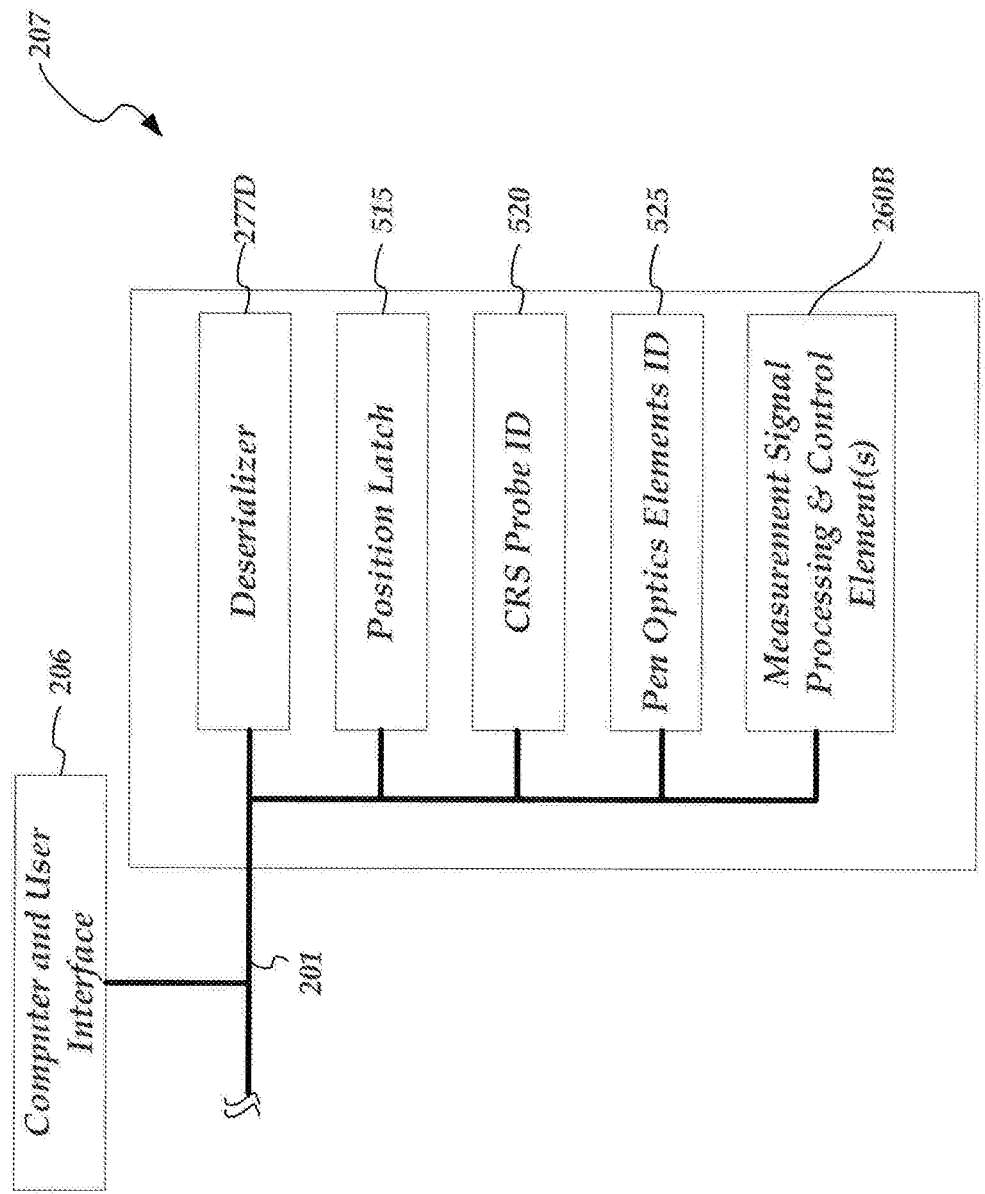
FIG. 5 is a block diagram illustrating the components of the probe controller of FIG. 2.

FIG. 5 is a block diagram of one embodiment of the computer and user interface 206 and the probe signal processing and control circuit 207 of FIG. 2. As shown in FIG. 5, the probe signal processing and control circuit 207 may include a deserializer 277D, a position latch 515, a CRS optical probe ID 520 and an optical pen ID 525. The components of the probe signal processing and control circuit 207 are coupled to one another and to the computer and user interface 206 by the data transfer line 201.

The deserializer 277D may work in conjunction with the serializer 277S shown in FIG. 3A, to allow various data signals to be serialized and communicated through the autojoint connection 230 using relatively few wires. The serializer 277S and a deserializer 277D are related to the utilization of certain low voltage differential signaling (LVDS) that may be used in some embodiments, as will be described in more detail below with respect to FIG. 7. Briefly, a synchronization signal is provided between a serializer and a deserializer, in order to ensure that they are synchronized. On the corresponding signal lines, clock signals are provided until the deserializer is finished, at which point the synchronization signal is switched, after which the relevant data signals are provided on the signal lines (as opposed to the previous clock signals.)

The position latch 515 relates to an XYZ latch signal that will be described in more detail below with respect to FIG. 7. Briefly, an XYZ latch signal is provided for synchronizing the measurement positioning of the CRS optical probe with the measurement positioning of the coordinate measurement machine controller 202. In one embodiment, the position latch 515 communicates with the position latch 204 in the coordinate measurement machine controller 202 in order to ensure that the coordinates of the coordinate measurement machine 210 are properly synchronized. In other words, the position latch 515 and the position latch 204 combine to ensure the accuracy of the overall derived measurements, such that the CMM machine coordinates (which reflect the position of the CRS optical probe during a particular measurement) are properly combined with the CRS optical probe measurements (which are relative to the CRS optical probe position).

The CRS optical probe ID 520 is utilized for determining the identification of the CRS optical probe 215' (e.g. by reading and processing an identification signal derived from an identifying element included in the CRS optical probe 215'), and the optics elements ID 525 is utilized for determining the identification of the interchangeable optics element 280 (e.g. by reading and processing an identification signal derived from an identifying element included in the interchangeable optics element 280). The proper identification of the CRS optical probe 215' and the interchangeable optics element 280 allow proper configuration and calibration data to be utilized in order to ensure accurate operations and resulting measurements from the CRS optical probe 215' and interchangeable optics element 280.

Figure 6:
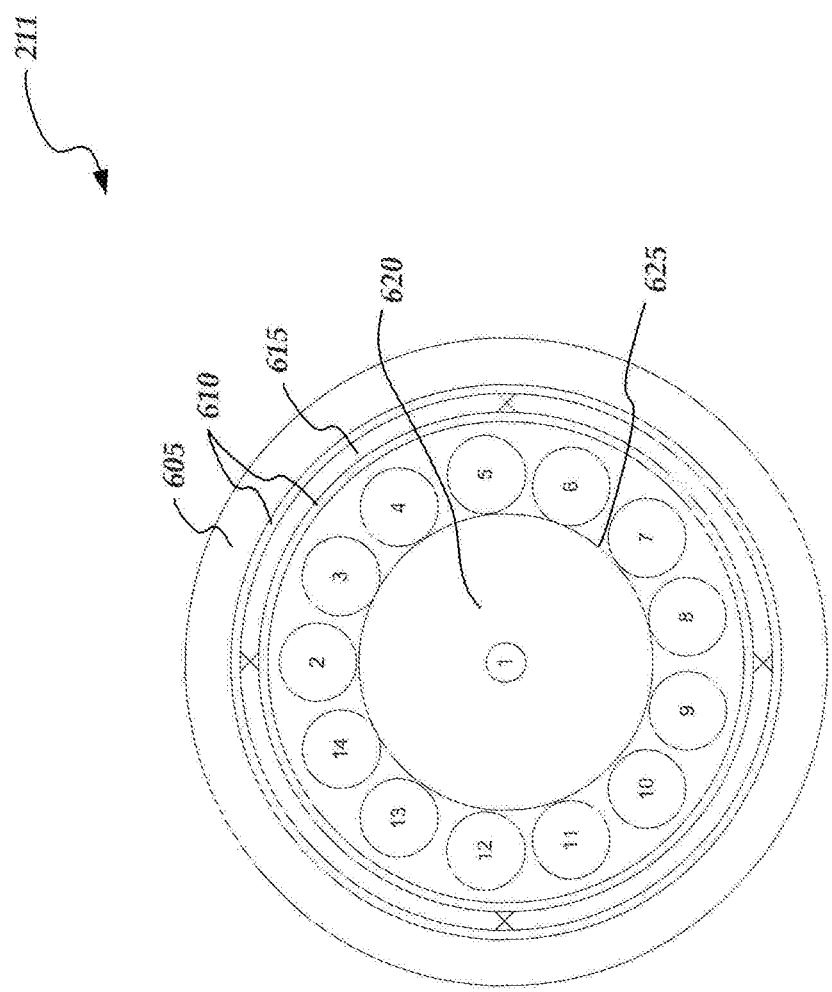
FIG. 6 is a diagram illustrating a cross section of the probe data cable of FIG. 2.

FIG. 6 is a diagram illustrating a cross section of the probe data cable 211 of FIG. 2. As shown in FIG. 6, the probe data cable 211 includes a sheath 605, sealing tape layers 610, an electrical outer shield layer 615 and a coaxial cable 620 including a central conductor "1" and an inner shield layer 625. Additional conductors 2 through 14 are shown as surrounding the coaxial cable 620, in accordance with a conventional Renishaw™ configuration, as will be described in more detail below with respect to FIG. 7.

FIG. 7 is a table 700 outlining one exemplary connection and/or signal scheme usable with the probe data cable 211 of FIG. 6 and/or the autojoint connection 230 shown in FIGS. 3A and 3B. The connection numbers in the "Wire #" column indicate the wire number of the cable 211 that is connected to an auto joint pin (e.g. one standard Renishaw™ autojoint connection configuration), unless otherwise indicated.

As shown in the table 700, in this embodiment, power and signal ground connections, the low voltage differential signaling (LVDS) serializer signals SERDES+, SERDES− and SERDES block/sync, a CRS signal for the spectrometer/detector reset, and CRS control clock and data signals (e.g. I2C clock and data signals) may be provided on the various wires and connected auto joint pins. It will be appreciated that a plurality of wires may be used in combination to provide power to the CRS CMM probe, in order to meet certain standard autojoint and/or CMM controller design requirements (e.g. not providing more than 300 mA through any single conductor). For example, using two wires at 12 V, 300 mA each provides the capability of delivering 7.2 watts within standard autojoint and/or CMM controller specifications.)

In general, the various signals may be routed on any suitable wire and/or autojoint pin. The serializer signals SERDES+, SERDES− are carried on lines/pins that connect the deserializer 277D and serializer 277S. Experiment and/or analysis may be used to select and/or verify the connections that provide reliable signal transmission. In various embodiments it may be particularly advantageous for the inner shield and outer shields to be connected to CRS ground, and the wire number COAX/1 used to carry the CRS detector signal(s) (the output spectral profile data or measurement signals, which may comprise spectrometer pixel value signal(s)) as indicated in the embodiment shown in FIG. 7. It will be appreciated that in a CRS system, it is relatively important that the spectrometer signals receive minimal distortion or additional noise. By utilizing the COAX portion (wire number 1) of the cable 211, minimal signal degradation results, thus providing a reliable means for transmitting the spectrometer signal.

With regard to the LVDS serializer signals SERDES+, SERDES−, they may be carried on two wires with a 3rd wire carrying an associated ground, and the SERDES lock/sync signal may be carried on an additional wire. With regard to the serialization sequence, in one embodiment a position D0 is designated as being for the detector pixel clock. A position D1 is designated as being for the profile start signal for the spectral profile measurement data. A position D2 is designated as being for the spectrometer ready signal. The position D3 is designated as being for the XYZ latch signal (e.g. as described in more detail above with respect to the position latch 515 of FIG. 5.) A position D4 is designated as being for a detector temperature alarm. The position D5 is designated as being for a spectrometer temperature alarm. The positions D6-D9 are not yet designated and thus are not specifically assigned in this embodiment.

With regard to the speed of the LVDS serialization, in one specific example implementation, the fastest available digital signal may be utilized (e.g. a detector pixel clock signal at several MHz.) The serializer may then sample the digital signals at a relatively fast rate (e.g. two times the detector pixel clock rate.) In one embodiment, the LVDS serializer may sample up to 10 digital signals per sample cycle. The serializer may then transmit the combined signals at a much faster rate (e.g. 2 times the detector pixel clock rate times<10 digital signals+2 synchronization bits>), which may provide a bit rate of more than 100 MHz, in some embodiments.

It will be appreciated that the above-described utilization of a low voltage differential signaling (LVDS) serializer is particularly advantageous where a limited number of connections are available in a standard autojoint connector. In other words, the standard autojoint connector only provides a limited number of connections (e.g. 13 pins.) In contrast, a standard CRS system may utilize significantly more conductors such as between the controller and the spectrometer (e.g. 24 conductors.) The conductor count can be reduced in part by avoiding non-crucial signals. However, for the remaining signals, the LVDS serializer technique allows more signals to be provided to the controller board using only two signal lines, as described above with respect to FIG. 7.

Such LVDS serialization techniques may provide at least three or more distinct signals over two connections/conductors through the auto exchange joint element, and in some embodiments up to 10 digital signals or types of information using only two conductors through the auto exchange joint element. The signals are made to be robust, in that the differential signals ignore common mode noise. The technique may be implemented with low power (e.g. in one specific example embodiment the signals may be sent at +/−500 mV with a 1V offset), which may be important in a CMM probe application. A high speed can be achieved (e.g. a range of 100 MHz to GHz operation.) The signals may travel over relatively long wires (e.g. multiple meters of wire when proper termination is utilized.) In one embodiment, the LVDS serialization techniques may be implemented using a SN65LV1023 serializer and SN67LV1224 deserializer from Texas Instrument of Dallas, Tex., USA. The signaling protocol outlined above, or other known LVDS signaling protocols, may be used.

As disclosed in more detail below with respect to FIGS. 8 to 17, in order to provide a desirable combination of features that provide another technically and economically attractive automatically interchangeable CRS optical probe system, instead of including components of the light source and wavelength detector portion 160A (e.g. including the wavelength detector 162 and light source 164) within a CRS optical probe assembly that is mated to a CMM through an auto joint connector, an auto-connecting free-space fiber coupling is provided in which the light used in the CRS optical probe assembly propagates in free space through optical elements mounted in a fixed relationship in the free-space fiber coupling. For example, in one implementation, a group of components in a light source and wavelength detector portion 160A (e.g. including the wavelength detector 162 and light source 164) may be excluded from a CRS optical probe assembly, and instead may be located remotely outside of the CRS optical probe assembly, if desired (e.g. to maintain low probe weight, probe balance and compact probe size). In one implementation, the group of components in the light source and wavelength detector portion 160A may be located with the measurement signal processing and control circuit 160B. In one implementation, the group of components in the light source and wavelength detector portion 160A may be located with a CMM controller (see coordinate measurement machine (CMM) controller 202 of FIG. 2).

Physical contact fiber couplers can easily be damaged with repeated mating cycles due to the contamination of fiber surfaces. Even a small amount of dust may lead to significant throughput loss. Thus, physical contact fiber couplers may provide for only a limited number of operation cycles. In one implementation, the use of an auto-connecting free-space fiber coupling provides for an automatically interchangeable CRS optical probe system configured for a high number of automated mating cycles and reduced risk of contamination.

Figure 8:
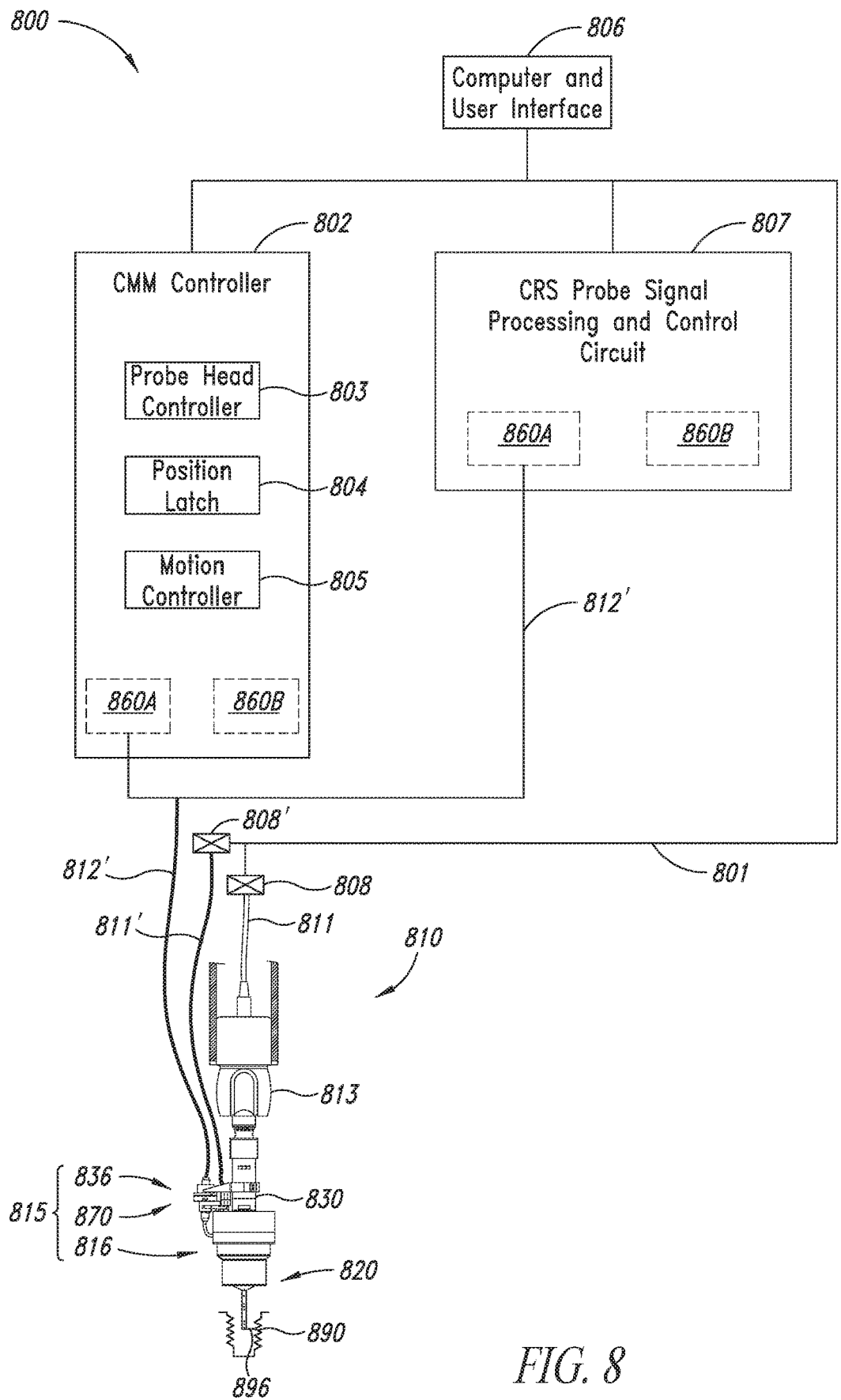
FIG. 8 is a block diagram of another coordinate measurement system including a coordinate measurement machine, a CRS optical probe including an optical pen, controllers and a user interface.

FIG. 8 is a diagram of a coordinate measurement system 800, and an automatically connectable and interchangeable CRS optical probe system 815. That is, the CRS optical probe system 815 may be automatically interchanged with other types of CMM probes. The coordinate measurement system 800 includes a coordinate measurement machine controller 802, a computer and user interface 806, a probe signal processing and control circuit 807, and a coordinate measurement machine 810. The controller 802 includes a probe head controller 803, a position latch 804 and a motion controller 805. The CRS optical probe 815 includes a probe assembly 816, an auto exchange joint element 836, and is connected to the coordinate measurement machine 810 through a mating joint element in the probe autojoint connection 830 (also referred to as an auto exchange joint connection), and through a free-space fiber coupling 870.

The coordinate measurement machine 810 communicates with other components through a data transfer line 801 (e.g. a bus), which is connected by a connector 808 (e.g. a "micro-D" type connector) to a probe head cable 811 which provides signals to and from the CRS optical probe 815. In various implementations, the data transfer line 801 may also be connected by a connector 808' to a cable 811' (e.g., as will be described in more detail below with respect to FIG. 9) which may additionally or alternatively provide power and/or communications to and from the CRS optical probe 815. The coordinate measurement machine 810 is controlled by the coordinate measurement machine controller 802, while the CRS optical probe 815 exchanges data with, and is controlled by, the probe signal processing and control circuit 807 (e.g. in one embodiment, a probe signal processing and control circuit including wavelength detector and light source elements 860A and detector measurement signal processing and control elements 860B, as outlined above with reference to the elements 160A and 160B in FIG. 1). The user may control all of the components through the computer and user interface 806. In some embodiments, the wavelength detector and light source elements 860A and the detector measurement and control elements 860B may be included in the CMM controller 802 instead of the probe signal processing and control circuit 807, as indicated by the dashed boxes in FIG. 8.

As outlined above, and described in more detail below with respect to FIG. 9, the CRS optical probe 815 includes a free-space fiber coupling 870, and an optical pen 820, which directs a measurement beam 896 toward a measurement surface 890. In one specific example implementation, the measurement surface 890 may comprise an internal surface of a threaded hole, such as discussed above with reference to FIG. 2.

Figure 9:
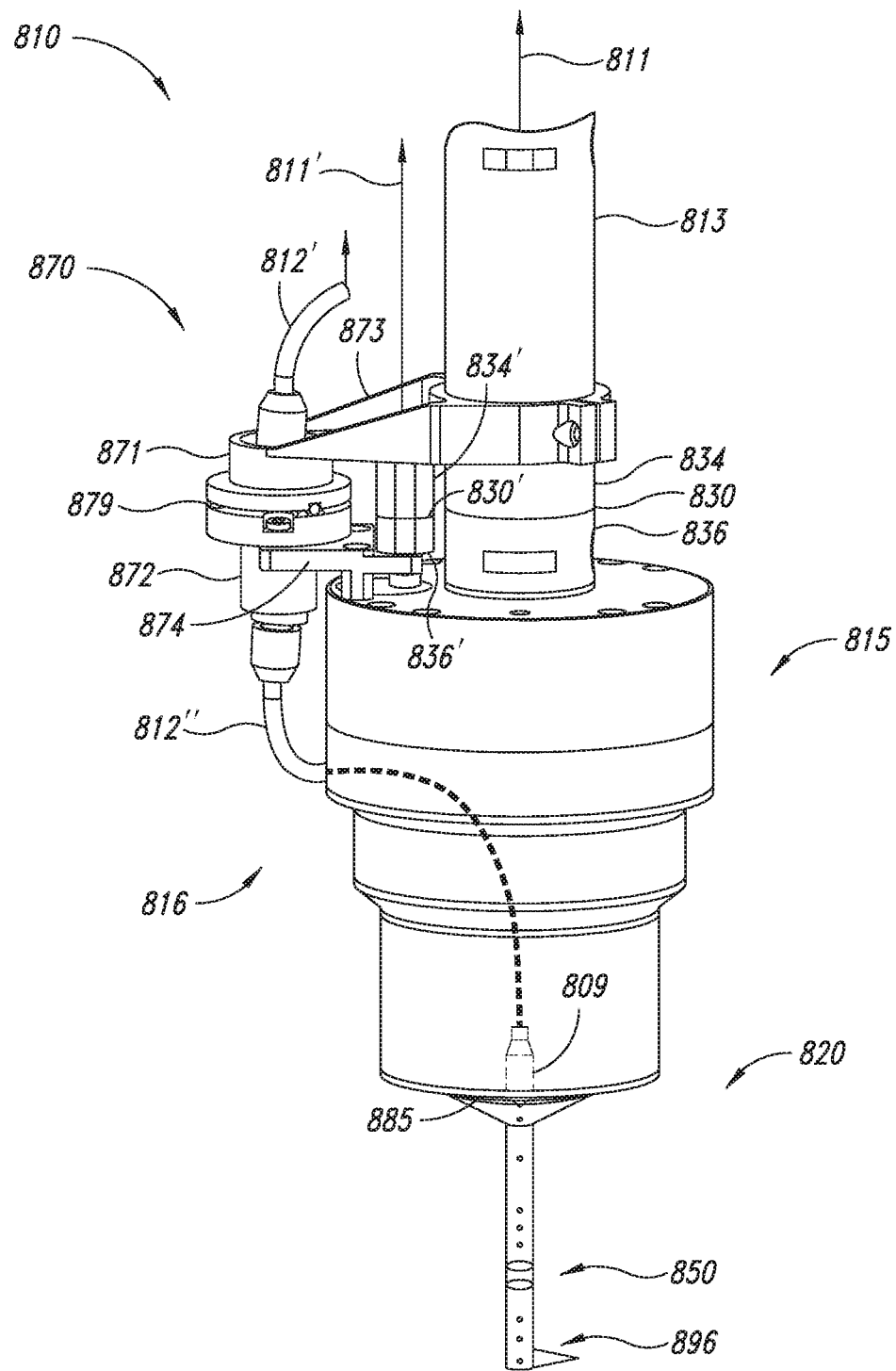
FIG. 9 is a diagram illustrating certain components of a first exemplary embodiment of the CRS optical probe of FIG. 8.

FIG. 9 is a diagram schematically illustrating certain components of the coordinate measurement machine 810 and a CRS optical probe 815 of FIG. 8. As shown in FIG. 9, the coordinate measurement machine 810 includes a probe head 813 (only a connector portion of which is illustrated in FIG. 9). The probe head 813 receives and transmits probe signals through the probe head cable 811, and may be similar to the probe head 213 of FIG. 2. The probe head 813 is connected to the probe 815 at a probe autojoint connection 830. The probe head cable 811 may be similar to the probe head cable 211 described above with respect to FIGS. 2, 3A, 3B and 6.

The probe head 813 in some embodiments rotates in 360 degrees in a horizontal plane and contains a type of U-joint. The probe autojoint connection 830 is an electro-mechanical connection that fastens the probe head 813 rigidly and mechanically to the CRS optical probe 815, in a way such that it can be disconnected from one probe and attached to another. In one embodiment, the probe autojoint connection 830 may include first and second mating auto exchange joint elements 834 and 836, wherein the first auto exchange joint element 834 is mounted to the probe head 813, and the second mating auto exchange joint element 836 is mounted to the CRS optical probe 815. In one embodiment, the probe autojoint connection 830 has mating electrical contacts or connections 835 so that when a probe is attached, the contacts automatically engage and make electrical connections.

In addition, in various implementations an electric auto connection 830' may also or alternatively be utilized for providing certain power and/or communications to and from the CRS optical probe 815. The electric auto connection 830' may be an electro-mechanical connection that couples a cable 811' to the CRS optical probe 815, in a way such that the cable 811' can be disconnected from one probe and attached to another. In one embodiment, the electric auto connection 830' may include first and second mating auto exchange elements 834' and 836', wherein the first auto exchange element 834' is mounted to the probe head 813, and the second mating auto exchange element 836' is mounted to the CRS optical probe 815. In one embodiment, the electric auto connection 830 has mating electrical contacts or connections so that when a probe is attached, the contacts automatically engage and make electrical connections. In various implementations, the electric auto connection 830 may be a kinematic coupling and/or may include magnets on either or both of the auto exchange elements 834' or 836' for holding the connection together.

The CRS optical probe 815 receives its power and control signals through the autojoint connection 830 and/or through the electric auto connection 830'. The signals passed to the CRS optical probe 815 through the autojoint connection 830 and/or through the electric auto connection 830' may be passed via connections, such as one or more of the connections 235 of FIG. 6 or other types of connections. The CRS optical probe 815 comprises a pen assembly 816 including an optical pen 820.

In various implementations, one particular advantage of the utilization of the electric auto connection 830' is in relation to the issue noted above for which a standard autojoint connection 830 may have a limited number of wired connections available, and for which more connections may be desirable/utilized for the CRS optical probe 815 (e.g., as may be provided through the electric auto connection 830'). In various implementations, in addition to certain standard power and/or communication signals, certain CRS optical probes 815 may also have additional features/capabilities that may require additional power and/or communication signals that can also be provided through the electric auto connection 830'. For example, in one implementation the CRS optical probe may include a rotational element (e.g., that is utilized to rotate an optics element of the optical pen 820 and the corresponding direction of a measurement beam 896 as illustrated in FIG. 8), and for which the electric auto connection 830' may be utilized to provide power and/or communication signals for powering and/or controlling the rotational element. One example of a CRS optical probe including a rotational element is described in U.S. Pat. No. 8,817,240, which is hereby incorporated herein by reference in its entirety. As illustrated and described in the '240 patent, in one embodiment a CRS optical probe may include a rotary element that rotates an optics element, and for which in various implementations the rotary element may include components such as bearings, gears and/or a motor for driving the rotation. In an implementation where a rotary configuration (e.g., including a motor, a rotational encoder, etc.) is utilized for driving and controlling the rotation of an optics element of the optical pen 820, the power and/or control signals for the rotary configuration may be provided through the electric auto connection 830'.

As shown in FIG. 8, the system 800 includes a free-space fiber coupling 870. The free-space fiber coupling may be a kinematic coupling. As illustrated in FIG. 9, a first coupling element 871 of the free-space fiber coupling 870 is fastened to the probe head 813 via a first clamp 873, and a second coupling element 872 of the free-space fiber coupling 870 is fastened to the CRS optical probe 815 by a second clamp 874. One or both of the first and second clamps 873, 874 may be a floating clamp or flexible bracket to allow some freedom of movement for one or more of the first coupling element 871 and the second coupling element 872, which may facilitate alignment and snapping together of the first and second coupling elements 871, 872 of the free-space fiber coupling 870, for example during an automated coupling process. It will be appreciated that during an automated coupling process, the first and second auto exchange elements 834', 836' of the electric auto connection 830' may similarly be aligned and couple together, and the first and second mating auto exchange joint elements 834, 836 of the probe autojoint connection 830 may similarly be aligned and couple together. During an automated decoupling/disconnect process, the respective elements may be pulled apart/decoupled to allow the CRS optical probe 815 to be removed from the probe head 813. Once decoupled, as part of a subsequent automated coupling process, the CRS optical probe 815 (or a different CRS optical probe) may be coupled to the probe head 813 or may be coupled to a different probe head. In various implementations, the probe autojoint connection 830, electric auto connection 830' and/or free-space fiber coupling 870 may each have respective coupling planes approximately aligned with one another which may have certain advantages (e.g., as related to facilitating the coupling/decoupling process, such as by simplifying/improving the overall mechanics of the coupling/decoupling, etc.) In various implementations, the second auto exchange elements 836' and/or other elements of the CRS optical probe may have certain portions that are configured (e.g., extended, indented, such as having grooves in the side, etc.) for facilitating being grasped or otherwise contacted and moved by a movement mechanism (e.g., a robot arm with engaging and/or grasping elements at the end) for engaging and moving the CRS optical probe 815 as part of an automated coupling or decoupling process to or from the probe head 813.

The first coupling element 871 of the free-space fiber coupling 870 is connected to a first fiber optic cable 812', which is coupled to the wavelength detector and light source elements 860A (see FIG. 8). The second coupling element 872 is connected to a second fiber optic cable 812", which is coupled to the optical pen 820. The free-space fiber coupling 870 may comprise FC/APC (angle polished connector, e.g., polishing the fiber at an 8 or 9 degree angle) fiber ferrule connectors having angled connections (e.g., 4 degree angles), which may facilitate reducing back reflection.

The optical pen 820 (analogous to the optical pen 120) may include a fiber optic connector 809, and a confocal optical path including an aperture 895 and chromatically dispersive optics portion 850, which outputs a measurement beam 896. In some embodiments, the optical pen 820 may include a repeatable fast exchange mount 885, which allows replacement of the chromatically dispersive optics portion 850, as described in greater detail in the description of FIGS. 4A and 4B.

Figure 10:
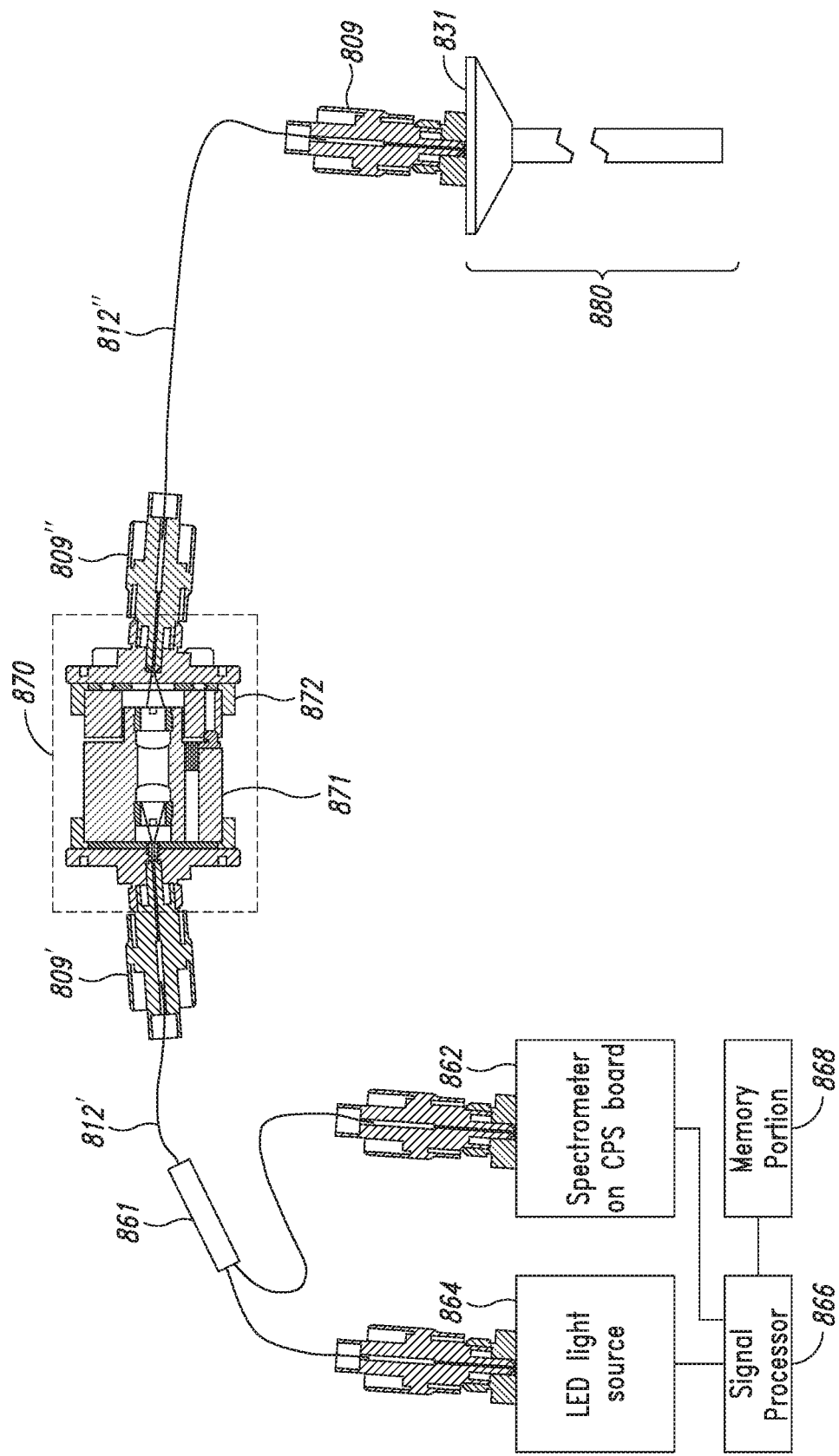
FIG. 10 is a block diagram illustrating the optical connection paths of an example embodiment of the system of FIG. 8.

FIG. 10 is a block diagram illustrating the optical connection paths of an example embodiment of the system 800 of FIG. 8. The optical pen 820 includes a fiber optic connector 809, and an optics element 880, which may be interchangeable. In various implementations, the fiber optic connector 809 may be attached to the end of a housing 831. In various alternative implementations, the fiber optic connector 809 may be mounted to a fixed mount and the optics element 880 may be mounted to a rotational element (e.g., in a configuration similar to the embodiment of the 240' patent wherein an interchangeable optics element is rotated by a rotary element, or in any other configuration with a rotational element for rotating the optics element). The fiber optic connector 809 receives a first end of an in/out optical fiber (not shown in detail) through a fiber optic cable 812" which encases it. The in/out optical fiber outputs source light and receives reflected light through a fiber aperture. The source light and reflected light are used to take measurements, such as discussed above in more detail in the description of FIG. 1.

A second end of fiber optic cable 812" is received in fiber optic connector 809" of the second coupling element 872 of free-space fiber coupling 870. A first end of fiber optic cable 812' is received in fiber optic connector 809' of the first coupling element 871 of free-space fiber coupling 870. Source light and reflected light are transmitted in free space within the free-space fiber coupling 870. A second end of the fiber optic cable 812' is coupled to a fiber coupler 861 of the electronics portion 860, which also includes a wavelength detector 862, a light source 864, a signal processor 866 and a memory portion 868. In various implementations, the fiber coupler 861, wavelength detector 862 and light source 864 may be included as part of a wavelength detector and light source elements 860A, and the signal processor 866 and memory portion 868 may be included as part of a detector measurement signal processing and control elements 860B (e.g., similar to the example configurations of FIGS. 1 and 8). In various embodiments, the wavelength detector 862 includes a spectrometer or spectrograph arrangement wherein a dispersive optics portion (e.g. a grating) receives the reflected light through the optical fiber cable 812' and transmits the resulting spectral intensity profile, for example to a detector array (see detector array 163 of FIG. 1). The wavelength detector 862 may also include related signal processing (e.g. provided by the signal processor 866, in some embodiments) that removes or compensates certain detector-related error components from the profile data. Thus, certain aspects of the wavelength detector 862 and the signal processor 866 may be merged and/or indistinguishable in some embodiments.

The white light source 864, which is controlled by the signal processor 866, is coupled through the optical coupler 861 (e.g. a 2×1 optical coupler) to the fiber cable 812'. As described above, the light travels through free-space fiber coupling 870 and the optical pen 820, which produces longitudinal chromatic aberration so that its focal length changes with the wavelength of the light. The wavelength of light that is most efficiently transmitted back through the fiber is the wavelength that is in focus on the surface 890 at the position Z (see FIGS. 1 and 8). The reflected wavelength-dependent light intensity then passes through free-space fiber coupling 870 and the fiber coupler 861 again so that a portion of the light (e.g., approximately 25% of the light for certain 1×2 optical couplers in such configurations) is directed to the wavelength detector 862, which may receive a spectral intensity profile distributed over an array of pixels along a measurement axis of the detector array (see detector array 163 of FIG. 1), and operate to provide corresponding profile data as described in more detail in the incorporated references and above in the discussion of FIG. 1.

Figure 11:
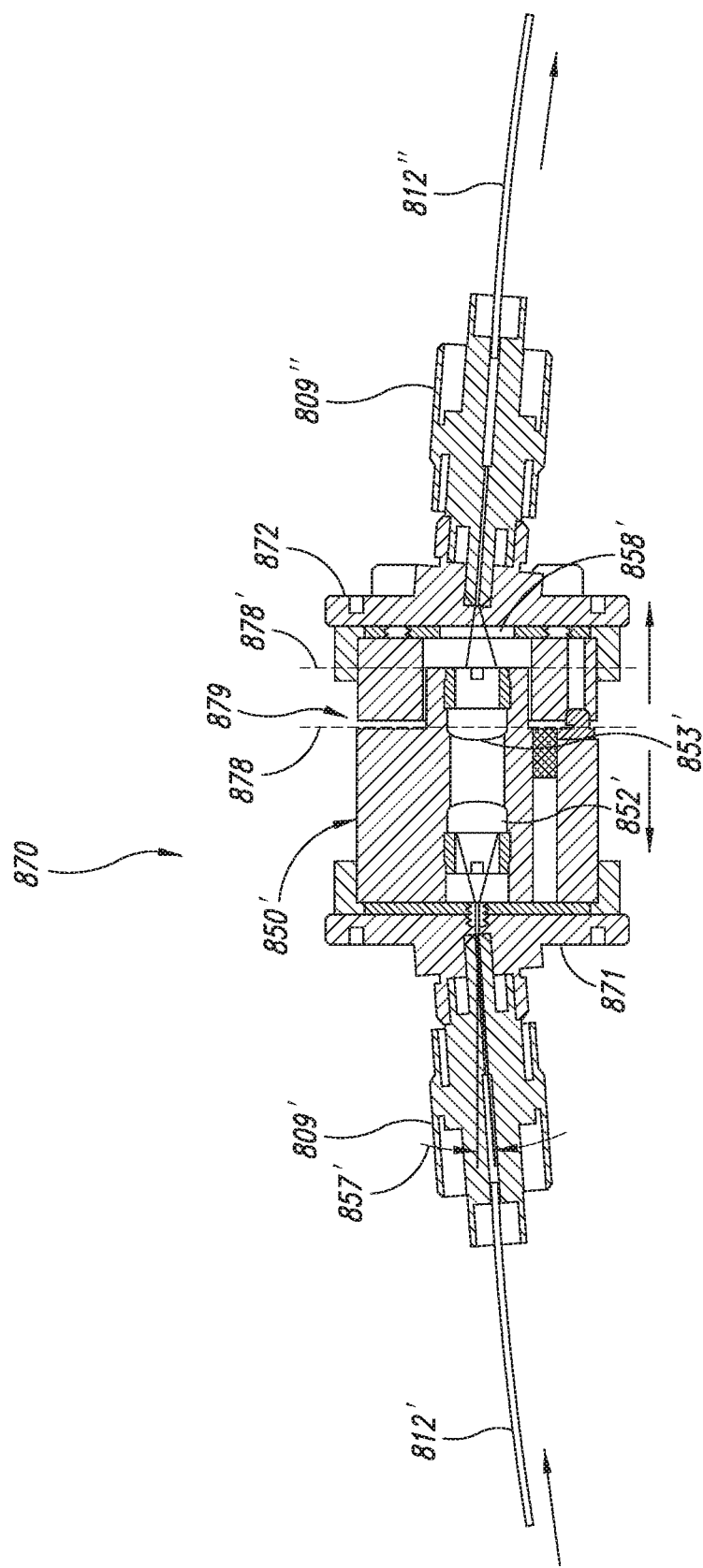
FIG. 11 is a diagram schematically illustrating components of an exemplary free-space fiber coupling of the system of FIG. 8.

FIG. 11 is a diagram schematically illustrating certain components of the free-space fiber coupling 870 of FIG. 8. The second end of fiber optic cable 812" is received in fiber optic connector 809" of the second coupling element 872 of free-space fiber coupling 870. The first end of fiber optic cable 812' is received in fiber optic connector 809' of the first coupling element 871 of free-space fiber coupling 870. The free-space fiber coupling 870 couples and decouples at a kinematic coupling plane 878 of a kinematic mount 879.

The first coupling element 871 on the source side has a lens system 850' including chromatic aberration corrected lenses to transmit the visible light spectrum. As illustrated, the lens system 850' includes a collimating lens 852' and a focusing lens 853'. The collimating lens 852' collects the output of the fiber of the fiber cable 812' secured in the fiber optic connector 809', and collimates the light into the focusing lens 853', which focuses the collimated light into the fiber of the fiber optic cable 812" secured in the fiber optic connector 809". The lens system 850' protects the fiber of the fiber cable 812', for example, by preventing dirt and dust to the fiber core. The second coupling element 872 on the sensor side has a protective glass window 858', which protects the fiber of the fiber cable 812". The light transmitted by the focusing lens 853' passes through the protective glass window 858', and enters the fiber of fiber cable 812". One of skill in the art would recognize that a lens may act as a collimating lens for light traveling in a first direction, and act as a focusing lens for light traveling in a second direction. For example, reflected light returns via the fiber of fiber cable 812" through the protective glass window 858' to the focusing lens 853', which acts as a collimating lens with respect to the reflected light, and collimates the reflected light into collimating lens 852'. Collimating lens 852' acts as a focusing lens for the reflected light, and focuses the reflected light into the fiber of the fiber cable 812'.

The fiber optic connectors 809', 809" as illustrated are FC/APC fiber ferrule connectors configured to secure the fiber of the fiber optic cables 812', 812" at an angle 857' with respect to an axis of the lens system 850', for example, at a 4 degree angle. The configuration facilitates reducing back reflection in the system 800.

In the example configuration of FIG. 11, the kinematic coupling plane 878 of the kinematic mount 879 is positioned approximately at the focusing lens 853', or between the focusing lens 853' and the fiber of the fiber optic cable 812". In addition, an end plane 878' of the first coupling element 871 and/or of the lens system 850' may be between the focusing lens 853' and the fiber of the fiber optic cable 812" (e.g., for which the end plane 878' may be parallel to the kinematic coupling plane 878 and be located at an end point or surface of the first coupling element 871 and/or lens system 850' that is closest to the fiber of the fiber optic cable 812"). As discussed in more detail below, positioning the coupling plane 878 and/or end plane 878' between the focusing lens 853' and the fiber of the optic cable 812" provides a kinematic coupling which is less sensitive to tilt and which has a low Z position dependence.

Figure 16:
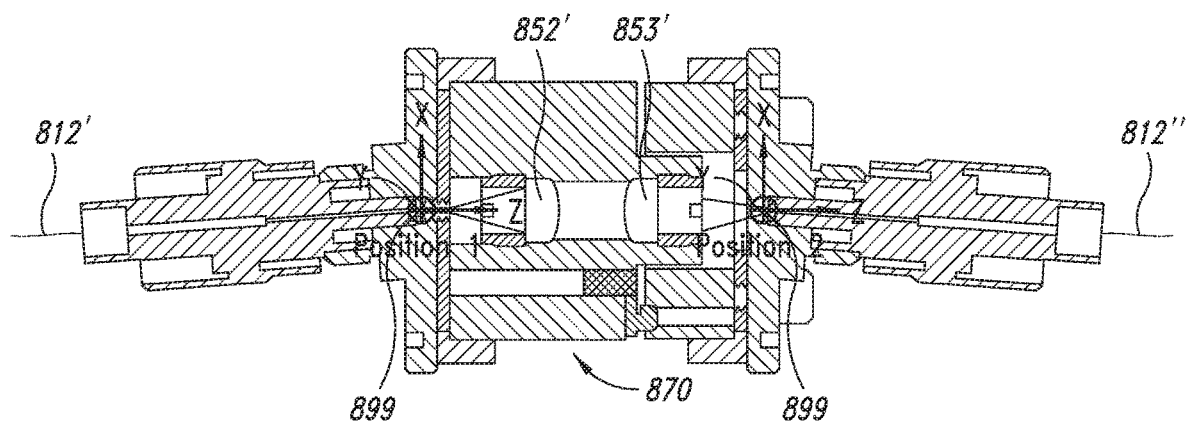
FIG. 16 illustrates an exemplary alignment mechanism of the free-space fiber coupling of FIG. 8.

As illustrated in FIG. 11, the lens system 850' is positioned in the first coupling element 871 on the source or CMM (see CMM 810) side, and the decoupling plane 878 is positioned at the focusing lens 853' or between the focusing lens 853' and the fiber of the sensor or CRS optical probe (see CRS optical probe 815) fiber cable 812". Such a configuration may facilitate reduced costs as only a single lens system would be needed to use a number of different CRS optical probes 815 with a single CMM 810. However, one of skill in the art would recognize that in some embodiments, the lens system 850' may instead be positioned in the second coupling element 872 on the sensor or CRS optical probe 815 side, with the decoupling plane 878 and/or end plane 878' positioned between the lens system 850' and the fiber of the source or CMM 810 side fiber cable 812'. Stated more generally, the configuration may be reversed (e.g., for which the implementations of FIGS. 8 and 9 may be representative of including the configuration in the orientations as illustrated in FIGS. 10, 11 and 16, or alternatively may include the configuration in a reversed orientation, with the lens system 850' and corresponding components on the side with the fiber optic cable 812", etc.

Figure 12A:
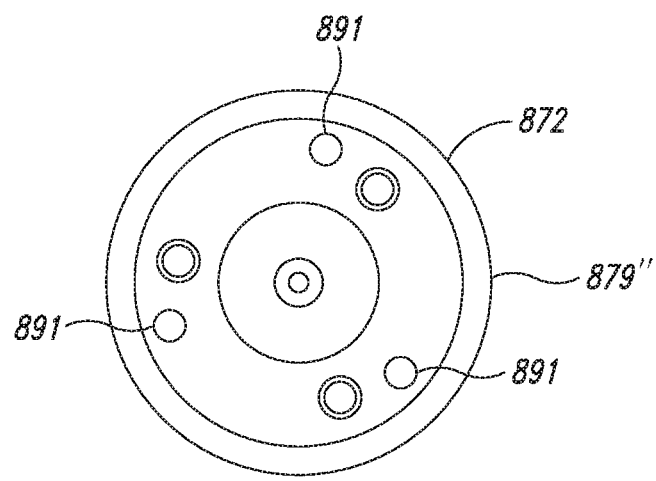
FIGS. 12A and 12B are diagrams illustrating certain details of an exemplary kinematic mount of the free-space fiber coupling of FIG. 8.
Figure 12B:
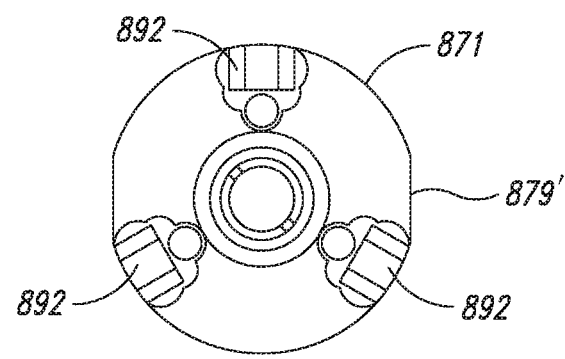

FIGS. 12A and 12B are diagrams illustrating certain details of an exemplary kinematic mount 879. FIG. 12A shows a sensor-side coupling 879" of the kinematic mount 879, and FIG. 12B shows a source-side coupling 879' of the kinematic mount 879. As illustrated, the sensor-side coupling 879" has three ball bearings 891 which mate with three corresponding v-grooves 892 of the source-side coupling 879'. Three corresponding magnets of the source-side coupling 879' are located proximate to and radially inward from each of the v-grooves 892, and act to magnetically couple (i.e., as part of the kinematic coupling) to the surface of the sensor-side coupling 879" that the ball bearings 891 are located on (i.e., magnetically coupling to the surface at locations just radially inward from each of the ball bearings 891 in the illustrated configuration). The ball bearings 891 and the v-grooves 892 are positioned so as to properly align the source-side coupling 879' and the sensor-side coupling 879" when the kinematic mount 879 is coupled together (e.g., the spacing of the ball bearings 891 and the v-grooves 892 may be non-uniform so that only one coupling position is possible). In various implementations, other types of kinematic mounts may be employed (e.g., cone mounts).

Figure 13:
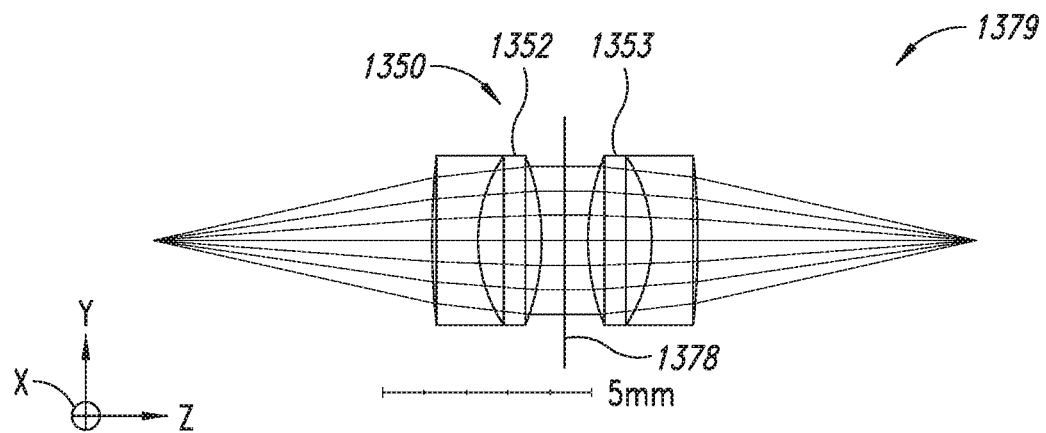
FIG. 13 illustrates one possible configuration of a lens system of a free-space fiber coupling.

FIG. 13 illustrates one possible configuration of a lens system 1350 of a fiber coupling 1370 (e.g., as representative of a configuration of certain prior systems). In FIG. 13, the coupling plane 1378 of the kinematic mount 1379 is positioned between the collimating lens 1352 and the focusing lens 1353 (e.g., as may be representative of a conventional location of a coupling plane in a fiber coupling configuration, with a lens and a fiber on each side of the coupling plane). The configuration of FIG. 13 is noted to have a high throughput sensitivity to tilt.

Figure 14:
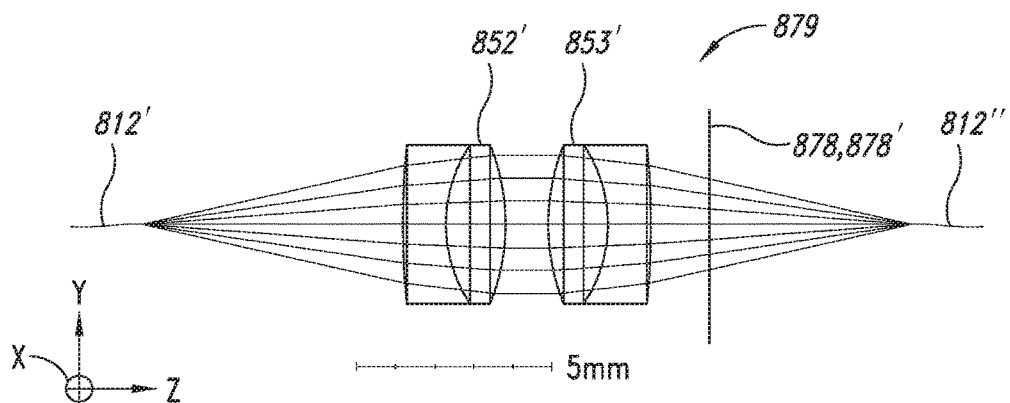
FIGS. 14 and 15 illustrate exemplary configurations of lens systems of a free-space fiber coupling of FIG. 8.
Figure 15:
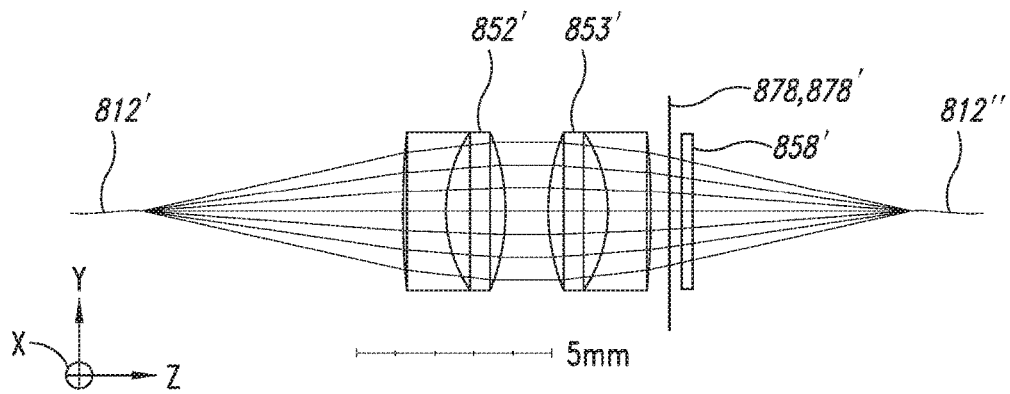

FIGS. 14 and 15 illustrate exemplary configurations of lens systems 850' of the free-space fiber coupling 870 of FIG. 8. In FIG. 14, the coupling plane 878 of the kinematic mount 879 is positioned between the focusing lens 853' and the fiber of the fiber cable 812". In various implementations, the location of the coupling plane 878 may also or alternatively be representative of a location of an end plane 878' of the first coupling element 871 and/or of the lens system 850' (e.g., of FIG. 11). Such configurations thus have both lenses 852' and 853' on one side of the coupling plane 878 and/or end plane 878' (e.g., the side with the fiber of the fiber cable 812'), and no lens(es) on the other side of the coupling plane 878 and/or end plane 878' (e.g., the side with the fiber of the fiber cable 812"). Such a configuration has a lower/improved throughput sensitivity to tilt, as compared to the configuration of FIG. 13, and has low throughput sensitivity to Z-position dependence and has a moderate sensitivity to lateral XY position tolerance. The tradeoff in reduced sensitivity to tilt vs. the sensitivity to the lateral XY position of fiber as compared to the configuration of FIG. 13 results in an improved overall throughput performance for the configuration of FIG. 14. FIG. 15 differs from FIG. 14 in that the configuration of FIG. 15 includes a protective glass 858' positioned between the focusing lens 853' and the fiber of the fiber cable 812". The protective glass window 858' may have an antireflective coating.

FIG. 16 illustrates an alignment mechanism of a kinematic mount of an exemplary free-space fiber coupling of the system of FIG. 8. As illustrated, one or more set screws 899 may be adjusted to align the fibers of the fiber cables 812', 812" relative to the lenses 852', 853'. Other alignment mechanisms may be employed. Once the alignment is set, the kinematic mount should be a highly repeatable and automatable coupling mechanism for the free-space fiber coupling 870.

Figure 17:
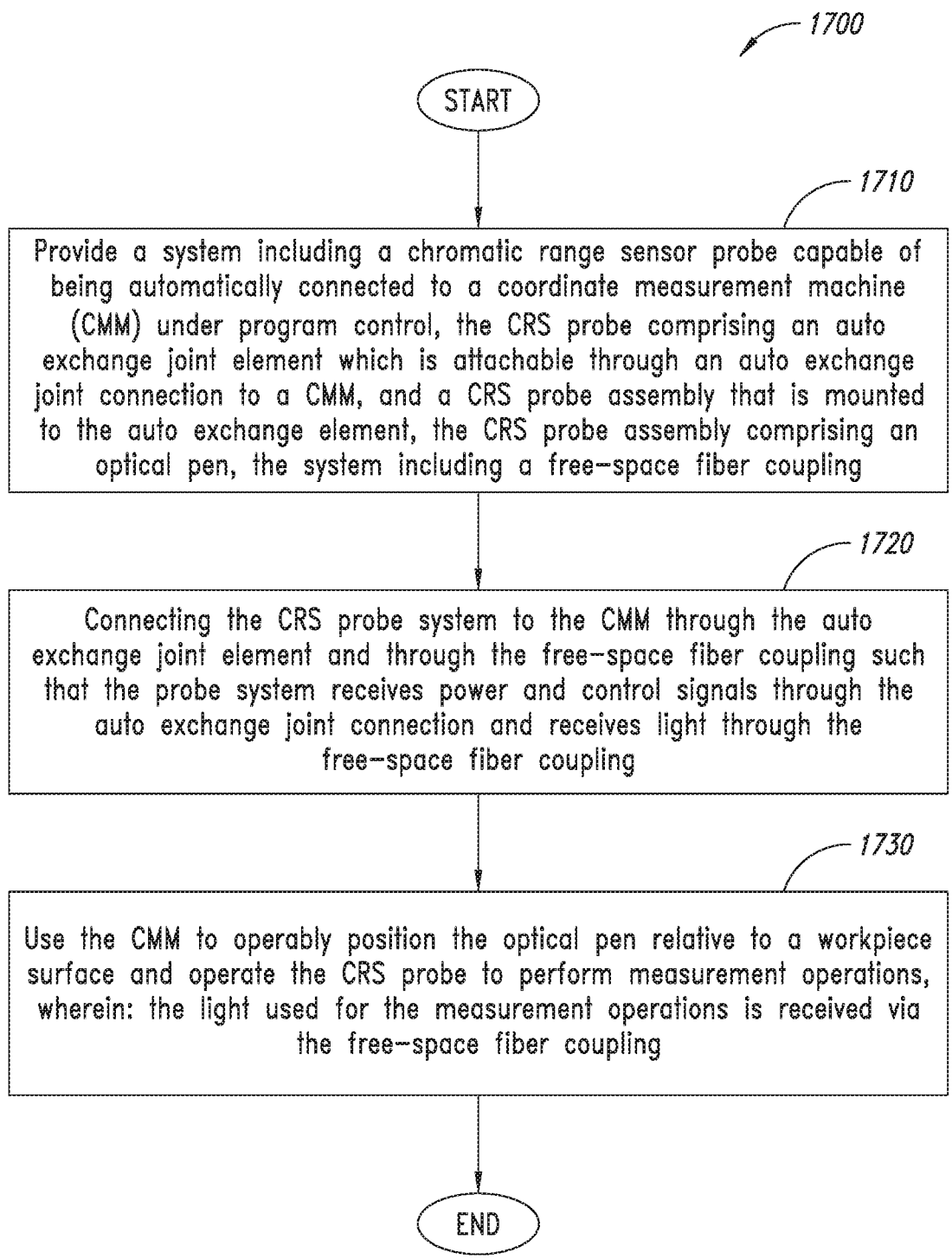
FIG. 17 is a flow diagram illustrating one exemplary embodiment of a routine for providing and operating an automatically interchangeable CRS optical probe system on a CMM.

FIG. 17 is a flow diagram illustrating one exemplary embodiment of a routine 1700 for providing and operating an automatically interchangeable CRS optical probe embodiment as disclosed herein. At a block 1710, a system is provided that includes a CRS optical probe that is capable of being automatically connected to a CMM under program control. The CRS optical probe includes an auto exchange joint element which is attachable through a standard auto exchange joint connection to a CMM, and a CRS optical probe assembly that is mounted to the auto exchange joint element for automatic connection to the CMM through the auto exchange joint element. The system includes a free-space fiber coupling to provide an optical path for the light used by the CRS optical probe assembly. The CRS optical probe assembly includes an optical pen. As outlined previously, in various embodiments the optical pen comprises a confocal optical path including a chromatically dispersive optics portion, the optical pen configured to focus different wavelengths at different distances along a measurement axis proximate to a workpiece surface to be measured. The light transmitted via the free-space fiber coupling comprises an input spectral profile of wavelengths routed to the optical pen.

At a block 1720, the CRS optical probe is connected to a CMM through the auto exchange joint element and through the free-space fiber coupling. Certain power and control signals may be provided to the CRS optical probe assembly through the auto exchange joint connection, and light for measurement is provided via the free-space fiber coupling.

At a block 1730, using the CMM, the optical pen is operably positioned relative to a workpiece surface, and the CRS optical probe system is operated to perform measurement operations wherein: the light used for measurement operations is transmitted and returned via the free-space fiber optic coupling.

While various embodiments have been illustrated and described, numerous variations in the illustrated and described arrangements of features and sequences of operations will be apparent to one skilled in the art based on this disclosure. For example, although the embodiments described above have emphasized certain control and data signals that are output in the form of signals that may be conducted through the probe autojoint connection 230/830 and/or electric auto connection 830', some or all of the signals could be wirelessly transmitted, and bypass the probe autojoint connection 230/830 and/or electric auto connection 830'. Thus, it will be appreciated that various changes can be made therein without departing from the spirit and scope of the invention.

In some implementations, a free-space fiber optic coupling has a first coupling element and a second coupling element configured to detachably couple together. The first coupling element has a first fiber optic connector configured to couple to wavelength detector and light source elements of a coordinate measurement machine (CMM) through an optical fiber of a first fiber optic cable, and is configured to mount to a probe head of the CMM. The second coupling element has a second fiber optic connector configured to couple to an optical pen of a chromatic range sensor (CRS) optical probe through an optical fiber of a second fiber optic cable, and is configured to mount to the CRS optical probe. One of the first and second coupling elements includes a pair of optical lenses configured to collimate light received via the optical fiber of the first fiber optic cable and focus the collimated light into the optical fiber of the second fiber optic cable. The pair of lenses is configured to collimate reflected light received via the optical fiber of the second fiber optic cable and focus the collimated reflected light into the optical fiber of the first fiber optic cable.

In some implementations, the first coupling element comprises a first kinematic coupling and the second coupling element comprises a second kinematic coupling configured to mate with the first kinematic coupling. In some implementations, the first coupling element includes the pair of optical lenses and a kinematic coupling plane of the first and second kinematic couplings is positioned between the focusing lens and the optical fiber of the second fiber optic cable.

In some implementations, the first fiber optic connector and the second fiber optic connector are fiber ferrule connectors. In some implementations, the first fiber optic connector and the second fiber optic connector are angle polished connectors. In some implementations, the the first fiber optic connector is configured to secure the optical fiber of the first fiber optic cable at an angle with respect to an axis of the lens system. The angle may be, for example, 4 degrees.

In some implementations, the first coupling element includes the pair of optical lenses and the second coupling element comprises a glass window configured to protect the optical fiber of the second fiber optic cable. The glass window may have an antireflective coating.

In some implementations, the pair of lenses comprises an aberration corrected lensing system. In some implementations, the pair of lenses is configured to protect the optical fiber of the first fiber optic cable.

In some implementations, a chromatic range sensor (CRS) optical probe has an optical pen and an optical fiber cable coupled to the optical pen. The optical pen has a confocal optical path including at least a confocal aperture and a chromatically dispersive optics portion, the optical pen configured to focus different wavelengths at different distances along a measurement axis proximate to a workpiece surface to be measured. The CRS optical probe has a coupling element of a free-space fiber coupling coupled to the optical fiber cable and mounted to the CRS optical probe. The coupling element is configured to receive focused light transmitted in free-space by a focusing lens of a corresponding coupling element of the free-space fiber coupling mounted to a probe head of a coordinate measurement machine (CMM). The CRS optical probe also has an auto exchange joint element which is attachable through an auto exchange joint connection to the CMM.

In some implementations, the coupling element of the CRS optical probe is mounted to the auto exchange joint element.

In some implementations, the coupling element of the CRS optical probe and the corresponding coupling element comprise kinematic couplings configured to mate. In some implementations, the coupling element of the CRS optical probe comprises a glass window configured to protect an optical fiber of the optical fiber cable. The glass window may have an antireflective coating.

In some implementations, the CRS optical probe has an interchangeable optics element which includes the chromatically dispersive optics portion.

In some implementations, a coordinate measurement machine (CMM), comprises light generating circuitry, wavelength detection circuitry, CMM control circuitry, a fiber optic cable coupled to the light generating circuitry and the wavelength detection circuitry, and a probe head having an auto exchange joint connection configured to couple to an auto exchange element of a chromatic range sensor (CRS) optical probe. The CMM includes a coupling element of a free-space fiber optic coupling mounted to the probe head. The coupling element is coupled to the fiber optic cable and has a free-space lens system including a pair of lenses, the lens system being configured to collimate light received via the fiber optic cable and focus the collimated light into a fiber of a fiber optic cable of a corresponding coupling element of the CRS optical probe.

The coupling elements of the free-space fiber optic coupling may comprise kinematic couplings configured to mate. A kinematic coupling plane of the free-space fiber optic coupling may be located on a side of the lens system opposite of the coupling to the fiber optic cable. The lens system may comprise an aberration corrected lensing system.

In some implementations, a system comprises a coordinate measurement machine (CMM) and a chromatic range sensor (CRS) optical probe. The CMM includes light generating circuitry, wavelength detection circuitry, CMM control circuitry, a probe head having an auto exchange joint connection and a first coupling element of a free-space fiber optic coupling mounted to the probe head. The CRS optical probe includes an optical pen having a confocal optical path including at least a confocal aperture and a chromatically dispersive optics portion, the optical pen configured to focus different wavelengths at different distances along a measurement axis proximate to a workpiece surface to be measured, a second coupling element of the free-space fiber coupling mounted to the CRS optical probe and an auto exchange joint element which is attachable through the auto exchange joint connection to the CMM. One of the first and second coupling elements of the free-space fiber coupling includes a free-space lens system having a pair of lenses and the other of the first and second coupling elements of the free-space fiber coupling is configured to receive focused light transmitted in free-space by the pair of lenses.

The first coupling element may comprise a first kinematic coupling and the second coupling element may comprise a second kinematic coupling configured to mate with the first kinematic coupling. The first coupling element may include the lens system with a kinematic coupling plane of the first and second kinematic couplings located between the lens system and an optical fiber of the second coupling element.

The first coupling element and the second coupling element may comprise fiber ferrule connectors. The second coupling element may comprise a glass window configured to protect an optical fiber. The lens system may comprise an aberration corrected lensing system.

In some implementations, a method comprises automatically coupling a coordinate measurement machine (CMM) to a chromatic range sensor (CRS) optical probe. The automatic coupling includes attaching an auto exchange joint element of the CRS optical probe to an auto exchange joint connection of the CMM and connecting a first coupling element of a free-space optical fiber coupling attached to the CMM to a second coupling element of the free-space optical fiber coupling attached to the CRS optical probe. One of the coupling elements of the free-space optical fiber coupling includes a pair of optical lenses. Light is generated using the CMM. The generated light is transmitted to the CRS optical probe via the free-space optical fiber coupling. The pair of optical lenses collimates the light generated by the CMM and focuses the light into an optical fiber of the second coupling element of the free-space optical fiber coupling. Reflected light from the CRS optical probe is transmitted to the CMM via the free-space optical fiber coupling. The pair of optical lenses collimates the reflected light and focuses the reflected light into an optical fiber of the first coupling element of the free-space optical fiber coupling. Measurement data may be generated based on the reflected light transmitted to the CMM. The first coupling element of the free-space optical fiber coupling may include the pair of optical lenses.

While preferred implementations of the present disclosure have been illustrated and described, numerous variations in the illustrated and described arrangements of features and sequences of operations will be apparent to one skilled in the art based on this disclosure. For example, it will be appreciated that a coordinate measurement machine as described herein may be any type of conventional coordinate measuring machine and/or may be any other type of machine utilizing an optical probe wherein coordinates are determined (e.g., a robot platform utilizing an optical probe, etc.) As another example, in addition to the CRS optical probes as described herein, other types of optical probes may also be utilized in the described systems and configurations (e.g., other non-contact white light optical probes may similarly be utilized for which the light is transmitted to the optical probe via the disclosed free-space optical fiber coupling, etc.) Various other alternative forms may also be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system, comprising:
a coordinate measurement machine (CMM) comprising:
  light generating circuitry;
  wavelength detection circuitry;
  CMM control circuitry;
  a probe head having an auto exchange joint connection; and
  a first coupling element of a free-space fiber optic coupling mounted to the probe head; and
a chromatic range sensor (CRS) optical probe comprising:
  an optical pen having a confocal optical path including at least a confocal aperture and a chromatically dispersive optics portion, the optical pen configured to focus different wavelengths at different distances along a measurement axis proximate to a workpiece surface to be measured;
  a second coupling element of the free-space fiber coupling mounted to the CRS optical probe; and
  an auto exchange joint element which is attachable through the auto exchange joint connection to the CMM, wherein one of the first and second coupling elements of the free-space fiber coupling includes a free-space lens system having a pair of lenses and the other of the first and second coupling elements of the free-space fiber coupling is configured to receive focused light transmitted in free-space by the pair of lenses.

2. The system of claim 1 wherein the first coupling element comprises a first kinematic coupling and the second coupling element comprises a second kinematic coupling configured to mate with the first kinematic coupling.

3. The system of claim 2 wherein the first coupling element includes the lens system, and at least one of an end plane of the first coupling element or a kinematic coupling plane of the first and second kinematic couplings is located between the lens system and an optical fiber of the second coupling element.

4. The system of claim 2 wherein the second coupling element comprises a glass window configured to protect an optical fiber.

5. The system of claim 4 wherein the glass window comprises an antireflective coating.

6. The system of claim 1 wherein the first coupling element and the second coupling element comprise fiber ferrule connectors.

7. The system of claim 6 wherein fiber ferrule connectors are angle polished connectors.

8. The system of claim 1 wherein the lens system comprises an aberration corrected lensing system.

9. The system of claim 1 wherein the first coupling element includes the lens system and the lens system is configured to protect the optical fiber of the first fiber optic cable.

10. The system of claim 1 wherein the lens system is configured to collimate reflected light received via an optical fiber of a fiber optic cable of the CRS optical probe and focus the collimated reflected light into an optical fiber of a fiber optic cable of the CMM.

11. A method, comprising:
automatically coupling a coordinate measurement machine (CMM) to a chromatic range sensor (CRS) optical probe, the automatic coupling including attaching an auto exchange joint element of the CRS optical probe to an auto exchange joint connection of the CMM and connecting a first coupling element of a free-space optical fiber coupling attached to the CMM to a second coupling element of the free-space optical fiber coupling attached to the CRS optical probe, wherein one of the coupling elements of the free-space optical fiber coupling includes a pair of optical lenses;
generating light using the CMM;
transmitting the generated light to the CRS optical probe via the free-space optical fiber coupling, the pair of optical lenses collimating the light generated by the CMM and focusing the light into an optical fiber of the second coupling element of the free-space optical fiber coupling; and
transmitting reflected light from the CRS optical probe to the CMM via the free-space optical fiber coupling, the pair of optical lenses collimating the reflected light and focusing the reflected light into an optical fiber of the first coupling element of the free-space optical fiber coupling.

12. The method of claim 11, comprising:
generating measurement data based on the reflected light transmitted to the CMM.

13. The method of claim 12 wherein the first coupling element of the free-space optical fiber coupling includes the pair of optical lenses.

14. A system for coupling a coordinate measurement machine (CMM) to a chromatic range sensor (CRS) optical probe, the CMM including light generating circuitry, wavelength detection circuitry, CMM control circuitry and a probe head having an auto exchange joint connection, the system comprising:
a first coupling element of a free-space fiber optic coupling mounted to the probe head of the CMM; and
a CRS optical probe comprising:
an optical pen having a confocal optical path including at least a confocal aperture and a chromatically dispersive optics portion, the optical pen configured to focus different wavelengths at different distances along a measurement axis proximate to a workpiece surface to be measured;
a second coupling element of the free-space fiber coupling mounted to the CRS optical probe; and
an auto exchange joint element which is attachable through the auto exchange joint connection to the CMM, wherein one of the first and second coupling elements of the free-space fiber coupling includes a free-space lens system having a pair of lenses and the other of the first and second coupling elements of the free-space fiber coupling is configured to receive focused light transmitted in free-space by the pair of lenses.

15. The system of claim 14 wherein the first coupling element comprises a first kinematic coupling and the second coupling element comprises a second kinematic coupling configured to mate with the first kinematic coupling.

16. The system of claim 15 wherein the first coupling element includes the lens system, and at least one of an end plane of the first coupling element or a kinematic coupling plane of the first and second kinematic couplings is located between the lens system and an optical fiber of the second coupling element.

17. The system of claim 15 wherein the second coupling element comprises a glass window configured to protect an optical fiber.

18. The system of claim 17 wherein the glass window comprises an antireflective coating.

19. The system of claim 14 wherein the first coupling element and the second coupling element comprise fiber ferrule connectors.

20. The system of claim 19 wherein fiber ferrule connectors are angle polished connectors.

21. The system of claim 14 wherein the lens system comprises an aberration corrected lensing system.

22. The system of claim 14 wherein the first coupling element includes the lens system and the lens system is configured to protect the optical fiber of the first fiber optic cable.

23. The system of claim 14 wherein the lens system is configured to collimate reflected light received via an optical fiber of a fiber optic cable of the CRS optical probe and focus the collimated reflected light into an optical fiber of a fiber optic cable of the CMM.

* * * * *